United States Patent
Sell et al.

(10) Patent No.: US 10,448,266 B2
(45) Date of Patent: Oct. 15, 2019

(54) SPATIALLY-RESOLVED QUALITY OF DATA TRANSMISSION

(71) Applicant: Telefonaktiebolaget LM Ericsson (publ), Stockholm (SE)

(72) Inventors: Frank Sell, Vaals (NL); Branko Djordjevic, Herzogenrath (DE); Alexander Federlin, Korschenbroich (DE); Tim Lauterbach, Kerkrade (NL); Ozgul Unal Karakas, Eigenbilzen (BE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 15/737,891

(22) PCT Filed: Jun. 22, 2015

(86) PCT No.: PCT/EP2015/064004
§ 371 (c)(1),
(2) Date: Dec. 19, 2017

(87) PCT Pub. No.: WO2016/206713
PCT Pub. Date: Dec. 29, 2016

(65) Prior Publication Data
US 2018/0302806 A1 Oct. 18, 2018

(51) Int. Cl.
H04W 24/02 (2009.01)
H04W 4/021 (2018.01)
H04W 72/08 (2009.01)

(52) U.S. Cl.
CPC ........... *H04W 24/02* (2013.01); *H04W 4/021* (2013.01); *H04W 72/08* (2013.01)

(58) Field of Classification Search
CPC ...... H04W 24/02; H04W 72/08; H04W 4/021
See application file for complete search history.

(56) References Cited

U.S. PATENT DOCUMENTS

| 2008/0057978 | A1* | 3/2008 | Karaoguz | H04W 48/16 455/456.3 |
| 2015/0141043 | A1* | 5/2015 | Abramson | G01C 21/34 455/456.1 |
| 2015/0166072 | A1* | 6/2015 | Powers | B60W 40/06 701/1 |

(Continued)

FOREIGN PATENT DOCUMENTS

| CA | 2808068 A1 | 2/2012 |
| EP | 1480353 A1 | 11/2004 |

(Continued)

OTHER PUBLICATIONS

International Search Report and Written Opinion of the International Searching Authority, PCT/EP2015/064004, dated Feb. 26, 2016, 18 pages.

(Continued)

Primary Examiner — Hashim S Bhatti
(74) Attorney, Agent, or Firm — Sage Patent Group

(57) ABSTRACT

Spatial information associated with a terminal connected to a network via a radio link is monitored. Depending on the spatial information and further depending on spatially-resolved quality of a data transmission, it is selected between operation of the data transmission in the first mode and in a second mode.

24 Claims, 13 Drawing Sheets

(56) References Cited

U.S. PATENT DOCUMENTS

2017/0279957 A1* 9/2017 Abramson et al. .......................... H04M 1/72577

FOREIGN PATENT DOCUMENTS

EP            2574096 A1    3/2013
WO    WO 2014/094843 A1    6/2014

OTHER PUBLICATIONS

Ryoo, J., et al., "Geo-Fencing: Geographical-Fencing Based Energy-Aware Proactive Framework for Mobile Devices," (XP032207373) IEEE 20th International Workshop on Quality of Service (IWQoS), Jun. 4-5, 2015, 9 pages.

* cited by examiner

SPATIALLY-RESOLVED QUALITY OF DATA TRANSMISSION

CROSS REFERENCE TO RELATED APPLICATIONS

This application is a 35 U.S.C. § 371 national stage application of PCT International Application No. PCT/EP2015/064004 filed on Jun. 22, 2015, the disclosure and content of which is incorporated by reference herein in its entirety.

TECHNICAL FIELD

Various embodiments relate to methods, devices, and computer software program products. In particular, various embodiments relate to a spatially-resolved quality of a data transmission between a network and a terminal connected to the network via a radio link.

BACKGROUND

In mobile communications, it is possible that a impaired or even unavailable data transmission between a network and a terminal connected to the network via a radio link is encountered. Often, the impaired data transmission changes as a function of location of the terminal, i.e., is spatially dependent, such that when the terminal moves through the coverage area of the network, degradation or lost connectivity can happen from one moment to the other. Typically, a user is not warned about possible degradation or lost connectivity. Service continuity or quality is often affected.

SUMMARY

Therefore, a need exists of advanced techniques which alleviate or solve at least some of the above-mentioned drawbacks. In particular, a need exists for advanced techniques of mobile communication where a high level of service continuity or quality can be provided to the user.

This need is met by the features of the independent claims. The dependent claims define embodiments.

According to an aspect, a method is provided. The method comprises monitoring spatial information associated with a terminal. The terminal is connected to a network via a radio link. The method further comprises retrieving control data. The control data indicates a spatially-resolved quality of a data transmission between the network and the terminal. The method further comprises, depending on the spatial information and further depending on the spatially-resolved quality of the data transmission: selecting between operation of the data transmission in the first mode and in a second mode.

According to an aspect, a device is provided. The device comprises at least one processor. The at least one processor is configured to monitor spatial information associated with the terminal. The terminal is connected to a network via a radio link. The at least one processor is further configured to retrieve control data. The control data indicates a spatially-resolved quality of a data transmission between the network and the terminal. The at least one processor is configured to select between operation of the data transmission in a first mode and in a second mode, depending on the spatial information and further depending on the spatially-resolved quality of the data transmission.

According to an aspect, a method is provided. The method comprises, for each one of a plurality of locations: retrieving an indicator of a quality of a data transmission at the respective location. The data transmission is between a network and a terminal connected to the network via a radio link. The method further comprises, based on the plurality of indicators: determining an area of predefined quality of the data transmission. The method further comprises, based on the determined area of predefined quality of the data transmission: determining control data indicating the quality of the data transmission spatially-resolved.

According to an aspect, a device is provided. The device comprises at least one processor configured to retrieve, for each one of a plurality of locations, an indicator of a quality of a data transmission at the respective location. The data transmission is between a network and a terminal connected to the network via a radio link. The at least one processor is further configured to determine an area of predefined quality of the data transmission based on the plurality of indicators. The at least one processor is further configured to determine control data indicating the quality of the data transmission spatially-resolved. Said determining of the control data is based on the determined area of predefined quality of the data transmission.

According to an aspect, a method is provided. The method comprises retrieving control data indicating a spatially-resolved quality of a data transmission between a network and a terminal connected to the network via a radio link. The method further comprises determining a geo-fence enclosing an area of predefined quality of the data transmission based on the spatially-resolved quality of the data transmission.

According to an aspect, a device is provided. The device comprises at least one processor configured to retrieve control data. The control data indicates a spatially-resolved quality of a data transmission between a network and a terminal connected to the network via a radio link. The at least one processor is further configured to determine a geo-fence enclosing an area of predefined quality of the data transmission based on the spatially-resolved quality of the data transmission.

According to an aspect, a device is provided. The device comprises means for monitoring spatial information associated with a terminal connected to a network via a radio link. The device further comprises means for retrieving control data. The control data indicates a spatially-resolved quality of a data transmission between the network and the terminal. The device further comprises means for selecting between operation of the data transmission in the first mode and in a second mode, depending on the spatial information and further depending on the spatially-resolved quality of the data transmission.

According to an aspect, a device is provided. The device comprises means for retrieving, for each one of a plurality of locations, an indicator of a quality of data transmission. The data transmission is between a network and a terminal connected to the network via a radio link. The device further comprises means for determining an area of predefined quality of the data transmission, based on the plurality of indicators. The device further comprises means for determining control data indicating the quality of the data transmission spatially-resolved, based on the determined area of predefined quality of the data transmission.

According to an aspect, a device is provided. The device comprises means for retrieving control data indicating a spatially-resolved quality of a data transmission between a network and a terminal connected to the network via a radio link. The device further comprises means for determining a geo-fence enclosing an area of predefined quality of the data transmission based on the spatially-resolved quality of the data transmission.

According to an aspect, a computer program product is provided. The computer program product comprises program code. Execution of the program code by at least one processor causes the at least one processor to execute a method comprising monitoring spatial information associated with a terminal. The terminal is connected to a network via a radio link. The method further comprises retrieving control data. The control data indicates a spatially-resolved quality of data transmission between the network and the terminal. The method further comprises, depending on the spatial information and further depending on the spatially-resolved quality of the data transmission: selecting between operation of the data transmission in the first mode and in a second mode.

According to an aspect a computer program product is provided. The computer program product comprises program code. Execution of the program code by at least one processor causes the at least one processor to execute a method comprising, for each one of a plurality of locations: retrieving an indicator of a quality of data transmission at the respective location. The data transmission is between a network and a terminal connected to the network via a radio link. The method further comprises, based on the plurality of indicators: determining an area of predefined quality of the data transmission. The method further comprises, based on the determined area of predefined quality of the data transmission: determining control data indicating the quality of the data transmission spatially-resolved.

According to an aspect, a computer program product is provided. The computer program product comprises program code. Execution of the program code by at least one processor causes the at least one processor to execute a method comprising retrieving control data indicating a spatially-resolved quality of a data transmission between a network and a terminal connected to the network via a radio link. The method further comprises determining a geo-fence enclosing an area of predefined quality of the data transmission based on the spatially-resolved quality of the data transmission.

According to an aspect, a system is provided. The system comprises a first device and a second device. The first device comprises at least one processor configured to retrieve, for each one of a plurality of locations, an indicator of a quality of a data transmission at the respective location, the data transmission being between a network and a terminal connected to the network via a radio link. The at least one processor of the first device is further configured to determine an area of predefined quality of the data transmission based on the plurality of indicators. The at least one processor of the further device is further configured to determine control data indicating the quality of the data transmission spatially-resolved, wherein the determining of the control data is based on the determined area of predefined quality of the data transmission. The second device comprises at least one processor configured to receive the control data from the first device. The at least one processor of the second device is further configured to determine a geo-fence enclosing the area of predefined quality of the data transmission based on the spatially-resolved quality of the data transmission.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments. In particular, aspects relating to determining of the control data and the geo-fence can be combined with aspects of selecting between operation of the data transmission in the first mode and in the second mode depending on the spatially-resolved quality of the data transmission indicated by the control data.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1A:
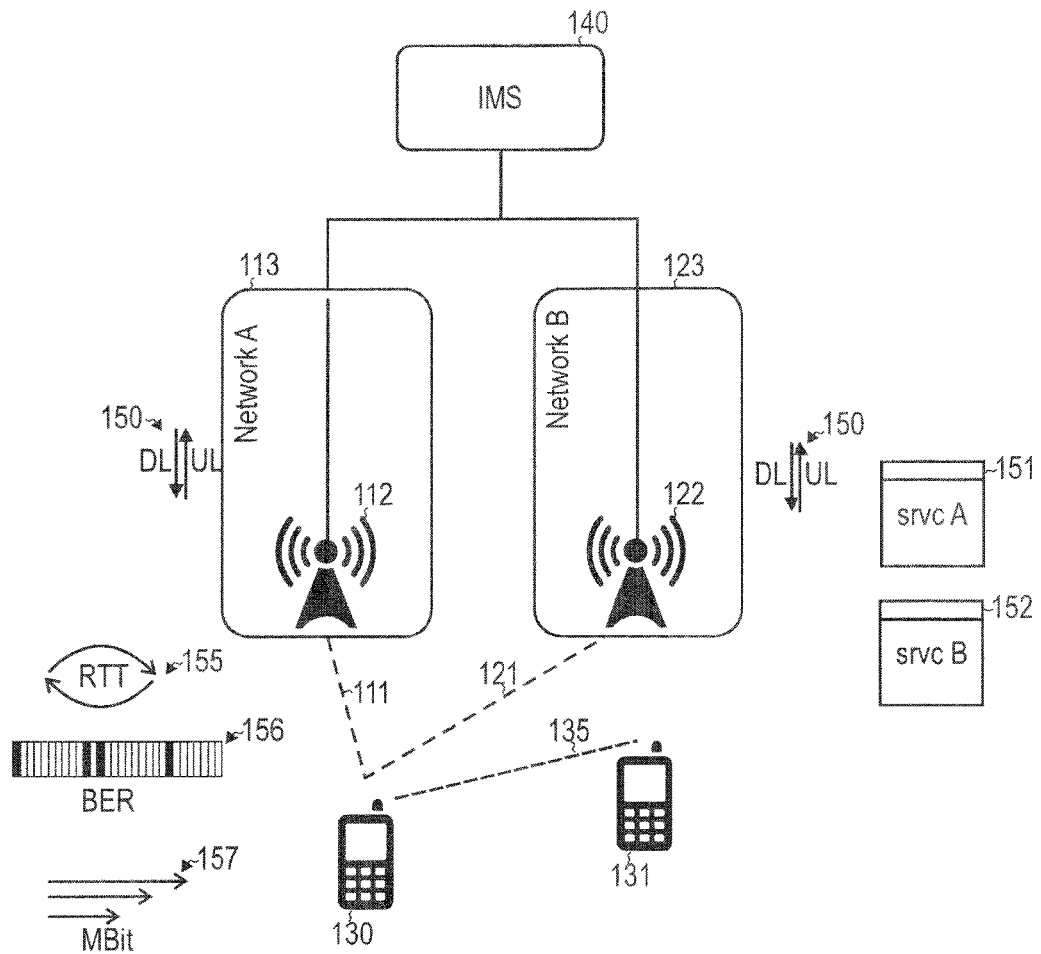
FIG. 1A illustrates an architecture of a terminal being connected to networks via two radio links, each radio link having an associated access node, and further illustrates aspects of a data transmission between the terminal and the networks.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of determining control data indicating a spatially-resolved quality of a data transmission between a network and a terminal connected to the network via a radio link are discussed.

Further, hereinafter, techniques of selecting between operation of the data transmission in a first mode and in a second mode depending on the control data, i.e., depending on the spatially-resolved quality of the data transmission between the network and the terminal are discussed. Said selecting further depends on spatial information associated with the terminal. The spatial information is monitored.

By providing the spatially-resolved quality of data, it becomes possible to enhance service continuity of the data transmission. In particular, by selecting between the operation in the first mode and in the second mode, countermeasures such as activation of a resilience mode can be taken if it is estimated that impaired quality of the data transmission is likely to be encountered. Countermeasures may be taken prospectively, e.g., by considering an expected route as the spatial information. In further scenarios, if it is estimated that superior quality of the data transmission is likely to be encountered, service enhancements can be activated; this may be because the superior quality of the data transmission can be assumed to secure a high quality of service.

FIG. 1A illustrates aspects of an architecture where determining of the spatially-resolved quality of the data transmission 150 and using the spatially-resolved quality of the data transmission 150 for selecting between operation of the data transmission 150 in the first mode and in the second mode can be applied. In FIG. 1A, a terminal 130 is connected to a packet network (PN) 140 via a network 113 and via a network 123 employing the data transmission 150; as such, parts of the data transmission 150 may be routed via the network 113 while other parts of the data transmission 150 may be routed via the network 123. In the scenario of FIG. 1A, the PN 140 implements an IP Multimedia Subsystem (IMS) and offers voice and/or video communication to the terminal 130 via the data transmission 150. Other PNs can be subject to the techniques as described herein. It is also possible to apply the techniques as described herein to circuit-switched (CS) services.

The terminal 130 may be any type of communication device, e.g., a mobile phone, a portable computer, a laptop, a smart television screen, a tethering access point node, a vehicle like for example a car implementing communication functionality, etc.

The data transmission 150 is between the terminal 130 and the IMS 140. The data transmission 150, in the scenario of FIG. 1A, comprises, both, uplink transmission (UL), as well as downlink transmission (DL). However, in various scenarios, it is possible that the data transmission 150 either comprises UL, or comprises DL, i.e., is implemented unidirectionally. E.g., the data transmission 150 may be implemented by one or more bearers or secure tunnels. E.g., the data transmission may be referred to as packet data session. Operation of the data transmission 150 may be influenced by various parameters, including, but not limited to transmission-control parameter and parameters of services 151, 152 providing data to the data transmission 150.

The network 113 comprises an access node 112. The network 123 comprises an access node 122. A radio link 111 is established between the access node 112 and the terminal 130. A radio link 121 is established between the access node 122 and the terminal 130. Optionally, it is possible that device-to-device (D2D) communication 135 between the terminal 130 and a further terminal 131 is supported. While in the scenario of FIG. 1A two radio links 111, 121 and two access nodes 112, 122 are shown, in general one or more than two radio links and access nodes could be included in the architecture.

Generally, the networks 113, 123 may operate according to various standards and protocols. In particular, the network 113 may operated according to a different standard and protocols than the network 123. Hereinafter, aspects of the spatially-resolved quality of the data transmission 150 are primarily explained in the context of the Third Generation Partnership Project (3GPP) Long Term Evolution (LTE) Radio Access Technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA). It is possible that the radio link 111 is operated according to the 3GPP LTE RAT while the radio link 112 is operated according to the 3GPP UMTS RAT.

However, generally, operation of the radio links 111, 121 is not limited to the scenario of a cellular network or a 3GPP-specified network. E.g., at least one of the radio links 111, 121 could be operated according to the Wireless Local Area Network (WLAN or Wi-Fi) RAT. E.g., at least one of the radio links 111, 121 could be operated according to Wireless Personal Area Network (WPAN) RAT; e.g., protocols such as Zigbee, Bluetooth Low Energy (BLE), IPv6 over Low power Wireless Personal Area Network (6LoWPAN) can build on the WPAN RAT.

Figure 1B:
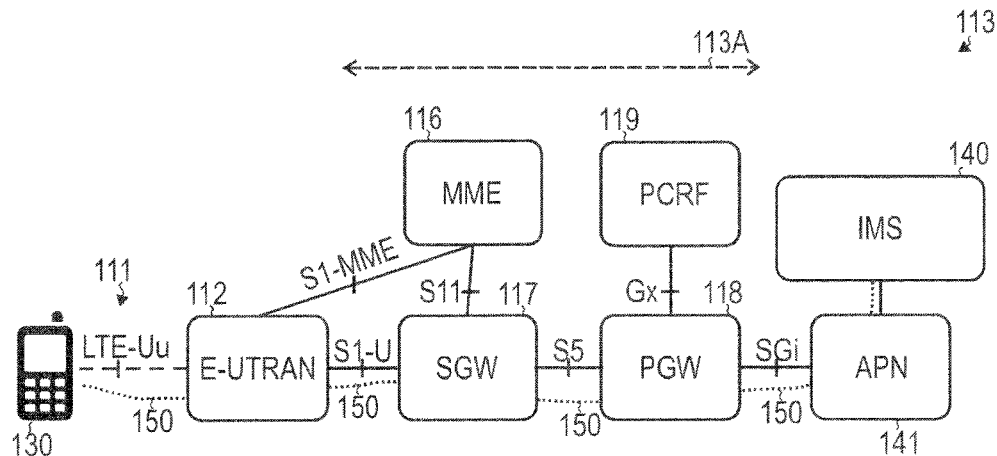
FIG. 1B illustrates the architecture of FIG. 1A in greater detail according to various embodiments, wherein the terminal is directly connected to one of the plurality of networks employing the radio link operating based on the Evolved Universal Mobile Telecommunications System Terrestrial Radio Access Radio Access Technology.

FIG. 1B is a detailed example of the architecture of the network 113 operating according to the 3GPP LTE RAT, sometimes referred to as 4G. Thus, FIG. 1B schematically illustrates a mobile communications network architecture. FIG. 1B schematically illustrates various aspects with respect to the packet data session 150. In particular, FIG. 1B schematically illustrates the evolved packet system (EPS) architecture of the LTE RAT. The EPS comprises a evolved packet core (EPC) as core network 113A and the Evolved UMTS Terrestrial Radio Access Network (E-UTRAN) for establishing a radio link in between the terminal 130 and the EPC 113A. The E-UTRAN is implemented by the access 112 being a evolved Node B (eNB). Optionally, also the access node 121 may implement the E-UTRAN; it is also possible, however, that the access node 121 implements a different RAT.

The data packet session is between the terminal 130, the E-UTRAN 112, the EPS 113A, and further the IMS 140.

The terminal 130 is attached to the network 113 implementing the EPS and referred to as Home Public Land Mobile Network (HPLMN). The terminal 130 is associated with a subscriber. Subscriber-specific data of the subscriber is maintained in a subscriber server node implemented by a Home Subscriber Server (HSS; not shown in FIG. 1B). In a roaming scenario the network 113 implements a Visiting Public Land Mobile Network (VPLMN; not shown in FIG. 1B).

The reference point implemented by the radio link 111 (shown by a dotted line in FIG. 1B) between the terminal 130 and the eNB 112 operates according to the LTE-uU protocol. The data transmission 150 may pass along the radio link 111.

The access node 112 is connected to a gateway node implemented by for example a Serving Gateway (SGW) 117. As such, the SGW 117 may route and forward data packets of the data transmission 150 and acts as a mobility anchor of the user plane during handovers of the terminal 130 between different cells of the HPLMN 113. The reference point between the access node 112 and the SGW 117 operates according to the S1-U protocol.

The SGW 117 is connected via a reference point operating according to the S5 protocol to a further gateway node implemented by for example a Packet Data Network Gateway (PGW) 118. The PGW 118 serves as an point of exit and point of entry of the HPLMN 113 for data packets of the data transmission 150 towards the IMS 140. As such, the PGW is connected with an access point node 141 of the IMS 140 via a reference point operating according to the SGi protocol. The access point node 141 is uniquely identified by an Access Point Name (APN). The APN is used by the terminal 130 to seek establishment of the data transmission 150 towards the IMS 140.

Access functionalities of the terminal 130 to the IMS 140, e.g., access functionality to the data transmission 150, may be controlled by a control node implemented by a mobility management entity (MME) 116. The MME 116 is connected via a reference point operating according to the S1-MME protocol with the access node 112. Further, the MME 116 is connected via a reference point operating according to the S11 protocol with the SGW 117. E.g., the MME 116 checks whether the subscriber associated with the terminal 130 is authorized to establish the data transmission 150 by accessing the access point node 141; for this, the APN may be checked.

Policy and charging functionality of the data transmission 150 is controlled by a control node 119 implemented for example by a policy and charging rules function (PCRF) 119. The PCRF 119 is connected via a reference point operating according to the Gx protocol with the PGW 118.

Figure 10:
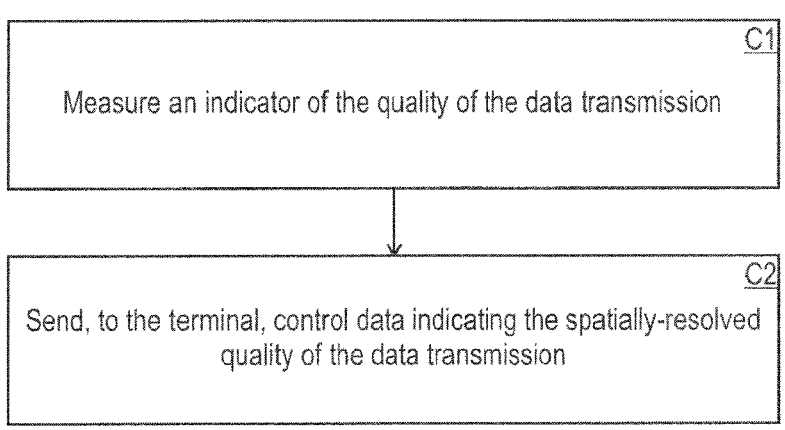
FIG. 10 is a flowchart of a method according to various embodiments, wherein the method comprises measuring the indicator of the quality of the data transmission.

With respect to FIG. 10, aspects of the connection between the terminal 130 and the HPLMN 113 are illustrated. FIG. 10 generally corresponds to FIG. 1B. However, in the scenario of FIG. 10, the terminal 130 is not directly connected with the HPLMN 113. Rather, the terminal 130 establishes a connection with a tethering access point node 130A via a Wi-Fi radio link 111A. The data transmission 150 is forwarded between the HPLMN 113 and the terminal 130 via the tethering access point node 130A and the radio link 111A.

The further radio link 111A can also be a wired link, e.g., a Local Area Network (LAN) link. E.g., employing the architecture of FIG. 10 it is possible to implement streaming a video on a laptop 130 connected to a vehicle over the radio link 111A. The car could have a radio connection via the radio link 111 to the Internet being the PN network 140. The laptop 130 may be using a wired data link 111A, but still be mobile. Also in such a scenario service continuity for the laptop 130 can be desirable.

As will be appreciated from the discussion of FIGS. 1A, 1B, and 10, the data transmission 150 between the IMS 140, the HPLMN 113, and the terminal 130 encounters various network elements including the access node 112, the SGW 117, the PGW 118 and the access point node 141. It is possible that malfunctioning, operation disruptions or overload of these network elements may cause impaired quality of the data transmission 150. Further, impaired quality of the data transmission 150 may also be caused by the operation of the control plane comprising the network element such as the MME 116 and the PCRF 119. Further, it is possible that impaired quality of the data transmission 150 is caused by the radio interface 111, e.g., by coverage gaps, etc. On the other hand, where these network elements operate undisturbed and reliable, superior quality of the data transmission 150 can result.

As can be seen from the above, there are different potential sources for the impaired or superior quality of the data transmission 150. In particular, in some scenarios the impaired or superior quality of transmission can originate from the EPC 113A; while, in other scenarios, the impaired or superior quality of the data transmission 150 can originate from properties of the radio link 111.

Generally, the impaired quality of the data transmission 150 can relate to a below-average user experience. Generally, the superior quality of the data transmission 150 can relate to above-average user experience. Generally, non-impaired quality of the data transmission 150 can relate to average or above-average user experience. Due to the wide range of influencing factors of the impaired quality of the data transmission 150 and the superior quality of the data transmission 150, different figures of merit of the data transmission 150 can be associated with the quality of the data transmission 150. This is explained hereinafter referring again to FIG. 1A.

SERVICE-SPECIFIC QUALITY OF THE DATA TRANSMISSION 150: it is possible that the quality of the data transmission 150 comprises a quality of service (QoS) of a given service 151, 152. In detail, it is possible that the data transmission 150 transports data for different services 151, 152. E.g., the different services 151, 152 can correspond to different higher-layer applications. E.g., one of the different services 151, 152 could correspond to Voice over LTE (VoLTE), while a second one of the different services 151, 152 could correspond to multimedia messaging, music streaming, video streaming, email, CS voice calls, and/or Internet access, etc. It is possible that impaired or superior quality of the data transmission 150 affects the different services 151, 152 differently. E.g., depending on the particular PN 140 with which a given service is associated, it is possible that one of the services 151, 152 suffers from the impaired quality of the data transmission 150, while the other one of the services 152, 152 does not encounter the impaired quality of the data transmission 150. Different services may be subject to different measures of the quality of the data transmission 150; e.g., for example the availability of high definition audio streaming vs. low definition audio streaming may be a viable measure of the quality of the data transmission 150 for an music streaming service; while availability of video call vs. voice calls may be a viable measure of the quality of the data transmission 150 for a messaging service. Hence, it is possible that the impaired or superior quality of the data transmission 150 is service-specific. A higher (lower) QoS of a specific service 151, 152 may correspond to a higher (lower) quality of the data transmission 150.

RADIO LINK-SPECIFIC QUALITY OF THE DATA TRANSMISSION 150: Likewise, it is possible that depending on the particular one of the radio links 111, 121 used for the data transmission 150, the impaired or superior quality of the data transmission 150 is selectively encountered. Hence, it is possible that the impaired or superior quality of the data transmission 150 is radio link-specific. E.g., the first one of the radio links 111, 121 may offer coverage, while a second one of the radio links 111, 121 may be out-of-coverage (coverage gap). E.g., it is possible that the quality of the data transmission 150 comprises a radio signal strength of transmission on the radio link 111, 121. E.g., the radio signal strength may be associated with a bit error rate (BER) 156. E.g., the radio signal strength may also be associated with the packet error rate or block error rate. A higher (lower) radio signal strength may correspond to a non-impaired or superior (impaired) quality of the data transmission 150. Likewise, a lower (higher) BER 156 can correspond to a non-impaired or superior (impaired) quality of the data transmission 150.

LATENCY: it is possible that the quality of the data transmission 150 comprises the latency 155. E.g., the latency may correspond to an end-to-end round-trip time (RTT) between endpoint nodes of the data transmission 150. The latency can alternatively or additionally also correspond to a RTT between different pairs of nodes, e.g., between the terminal 130 and the access node 112. A higher (lower) latency 155 can correspond to a non-impaired or superior (impaired) quality of the data transmission 150.

DATA THROUGHPUT: it is possible that the quality of the data transmission 150 comprises a data throughput per time 157, sometimes also referred to as bandwidth of the data transmission 150. E.g., the data throughput per time 157 may be measured in kilobits per second or megabits per second. A higher (lower) data throughput per time 157 can correspond to a non-impaired or superior (impaired) quality of the data transmission 150.

Thus, as can be seen from the examples above, various figures of merit exist with respect to determining the quality of the data transmission 150. Here, generally, it is possible that service-specific predefined thresholds and/or radio link-specific predefined thresholds are used when judging whether a given quality of the data transmission 150 is associated with impaired quality or non-impaired quality or superior quality. The predefined threshold can be specific for the particular figure of merit used for quantifying the quality of the data transmission 150.

Figure 1C:
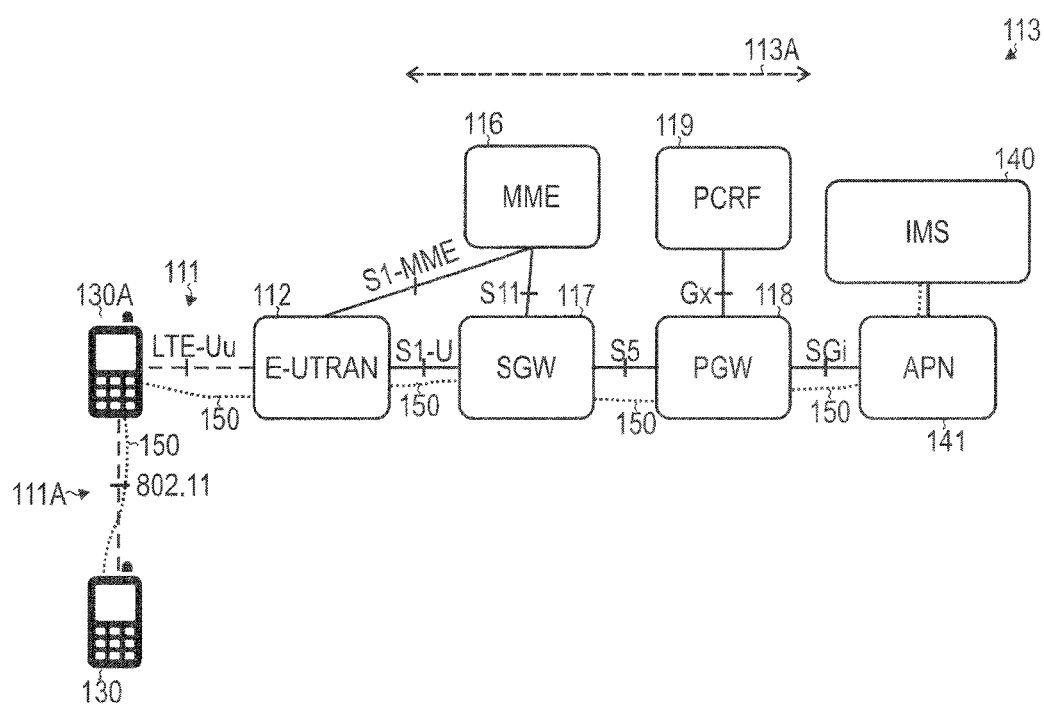
FIG. 1C illustrates the architecture of FIG. 1A in greater detail according to various embodiments, wherein the terminal is indirectly connected via a tethering Wireless Local Area Network access point node to one of the plurality of networks employing the radio link operating based on the Evolved Universal Mobile Telecommunications System Terrestrial Radio Access Radio Access Technology.

While with respect to FIGS. 1A-1C primarily packet-switched (PS) functionality has been illustrated, it is also possible that in various scenarios the data transmission 150 relates CS functionality, e.g., when implementing voice calls via the UMTS RAT, sometimes referred to as 3G.

Figure 2:
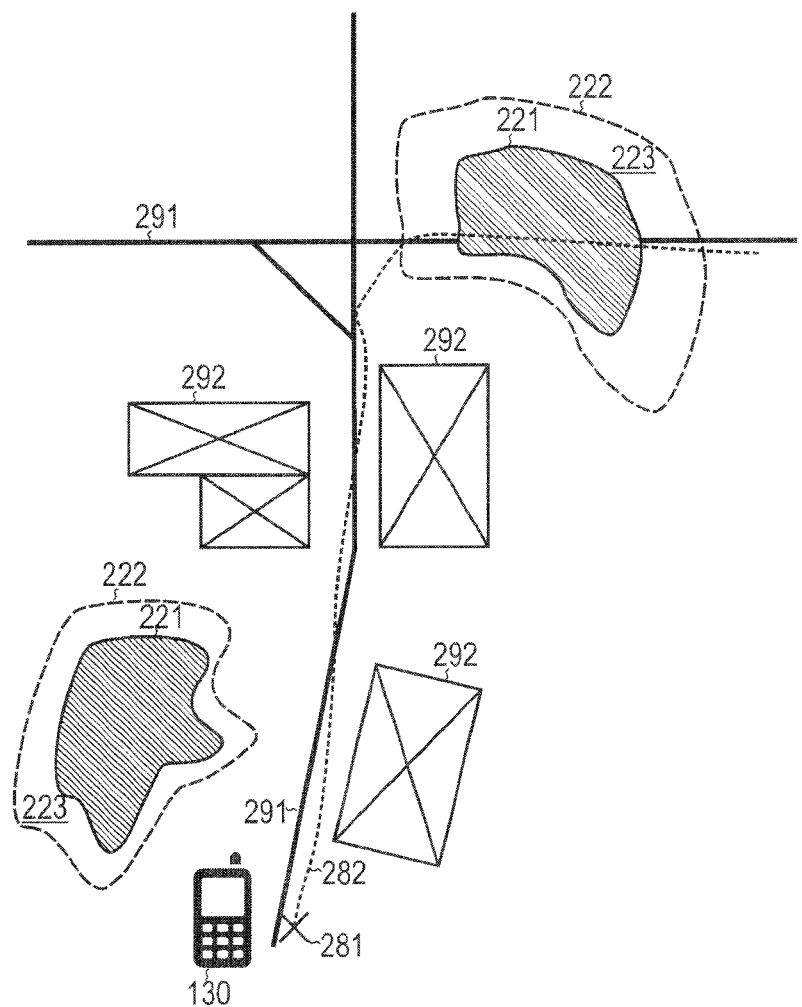
FIG. 2 schematically illustrates a location and an expected route of the terminal with respect to areas of impaired quality of the data transmission and further illustrates geographical features.

It is possible that the quality of the data transmission 150 as illustrated above varies as a function of location. I.e., it is possible that the quality of the data transmission 150 is spatially dependent. In FIG. 2, various aspects with respect to the spatially-dependent quality of the data transmission 150 are illustrated. In FIG. 2, a location 281 and an expected route 282 of the terminal 130 are illustrated. As can be seen, the expected route 282 of the terminal 130 follows a road 291 and passes by houses 292. Due to such geographical features as the road 291 and the houses 292, shadowing effects with respect to the location of the access node 112 (not shown in FIG. 2) can occur. Because of this, it is possible that locally a reduced radio signal strength 156 of the transmission on the radio link 111 causes an impaired quality of the data transmission 150. Further reasons of locally impaired quality of the data transmission 150 comprise different network elements 112, 116, 117, 118, 119, 141 influencing the data transmission 150 locally. E.g., where handovers between neighboring cells of the cellular HPLMN 113 occur, responsibilities my be handed over to different access nodes 112. Also, the responsible SGW 117, etc. may change in various scenarios. All such scenarios can cause local variation of the quality of the data transmission 150.

In particular, illustrated in FIG. 2 (shaded areas) are areas 221 of impaired quality of the data transmission 150. As can be seen, the expected route 282 of the terminal 130 crosses one of the areas 221 of impaired quality of the data transmission 150. This allows to conclude that it is likely that impaired quality of the data transmission 150 is encountered in the near future. Prospective countermeasures may be taken.

To facilitate the determining of impaired quality of the data transmission 150, e.g., prospectively and sufficiently early, in the scenario of FIG. 2 geo-fences 222 enclose the areas 221 of impaired quality of the data transmission 150. In detail, the geo-fences 222 enclose a safety margin 223 which, in turn, encloses the areas 221 of impaired quality of the data transmission 150. By means of the safety margin 223 it is possible to communicate the possibility of impaired quality of the data transmission 150 before the impaired quality of the data transmission 150 affects the communication between the HPLMN 113 and the terminal 130; i.e., a further layer of prospective control may be added.

Generally, the geo-fences 222 may enclose areas 221 of impaired quality of the data transmission 150; in other scenarios, the geo-fences 222 may alternatively or additionally enclose areas 221 superior quality of the data transmission 150. For illustrative purposes, hereinafter, reference is made predominantly to the geo-fences 222 enclosing areas 221 of impaired quality.

E.g., the geo-fence 222 may comprise a set of boundary lines and/or boundary nodes which may define a closed surface in a geo-coordinate system. Thus, it can be determined whether a certain location is located inside or outside the geo-fence 222. Thereby, the geo-fences 222 can facilitate checking whether the terminal 130 is likely to be affected by the area 221 of impaired quality of the data transmission. E.g., it may be possible that control data which indicates the geo-fences 222 is determined. Here, concepts of geo-messaging can be applied.

Figure 3:
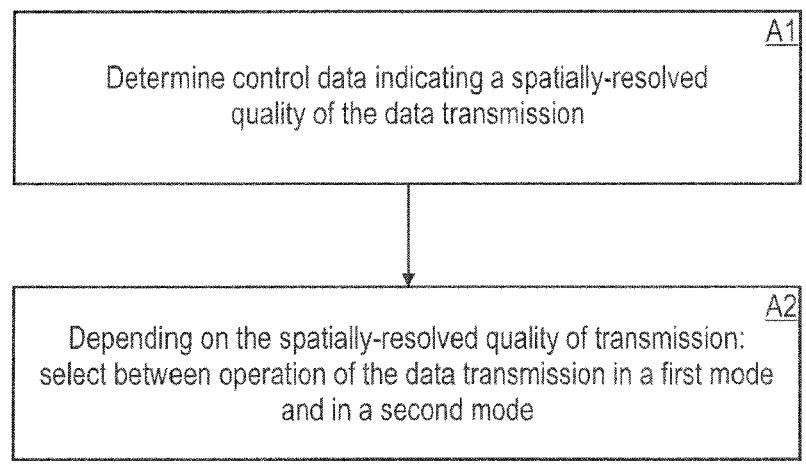
FIG. 3 is a flowchart of a method according to various embodiments, wherein the method comprises determining control data which indicates a spatially-resolved quality of the data transmission and further comprises selecting between operation of the data transmission in the first mode and in a second mode, depending on the spatially-resolved quality of the data transmission.

Thus, turning to FIG. 3, by comparing the spatial information such as for example the location 281 and the expected route 282 of the terminal 130 with the determined control data which indicates the quality of the data transmission 150 spatially-resolved (A1), it becomes possible to take countermeasures such as operating the terminal 130 and/or further network elements 112, 117, 118, 116, 119, 141 in a resilience mode. Such countermeasures may influence the operation of the data transmission 150. Thus, generally, depending on the control data is possible to select between operation of the data transmission 150 in a first mode and in a second mode (A2).

By such countermeasures, it is possible to reduce negative impacts of the impaired quality of the data transmission 150 encountered when entering the area 221. For example, it is possible that the services 151, 152 making use of the data transmission 150 can be provided with higher reliability. It is also possible that new services 151, 152 can be offered to overcome constraints of service and coverage gaps encountered due to the impaired quality of the data transmission 150. If applicable, the countermeasures are taken prospectively. Then, countermeasures may be taken while non-impaired or superior quality of the data transmission 150 is encountered, allowing to buffer data before the impaired quality of the data transmission 150 actually takes place.

Section 1

Determining the Control Data Which Indicates the Spatially-Resolved Quality of the Data Transmission With respect to FIGS. 4, 5, 6A, 6B, 7, 8, 9A, 9B, 10, 11, and 12, various aspects with respect to step A1, i.e., the determining of the control data which indicates the spatially-resolved quality of the data transmission 150 are illustrated.

Figure 4:
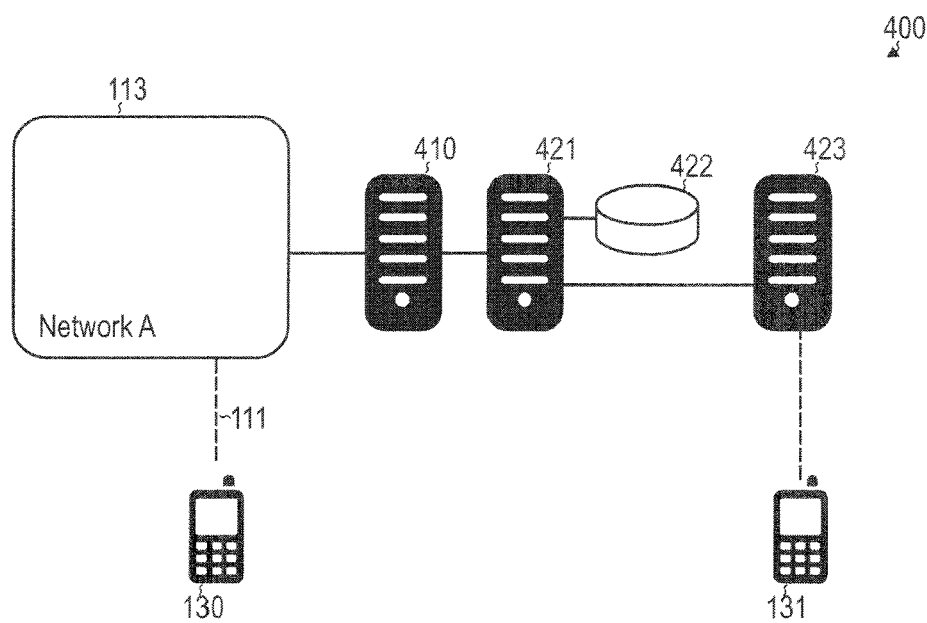
FIG. 4 illustrates an architecture used for said determining of the control data according to various embodiments, wherein the control data is determined by the network.

In FIG. 4, various aspects with respect to the architecture of the system 400 configured to determine the control data indicating the quality of the data transmission 150 in a spatially-resolved manner is illustrated. The example system 400 comprises a geo analyzer 421. The geo analyzer 421 is configured to retrieve, for each one of a plurality of locations, an indicator of a quality of the data transmission 150 at the respective location. For this, the geo analyzer 421 is connected with the database 422 and may be further connected with a measurement server 423. E.g., in various scenarios, said retrieving of the indicator of the quality of the data transmission 150 can comprise retrieving the respective indicator from the database 422. E.g., in various scenarios, said retrieving of the indicator of the quality of the data transmission 150 can comprise receiving a measurement report from a further terminal 131, e.g., via the measurement server 423. E.g., the measurement server 423 may employ techniques of Minimization of Drive Tests (MDT). Then, the geo analyzer 421 is further configured to determine the area 221 of the impaired quality of the data transmission 150 depending on the plurality of indicators; alternatively or additionally, the geo analyzer 421 is configured to determine areas of superior quality of the data transmission 150 depending on the plurality of indicators: Thus, generally, the geo analyzer 421 is configured to determine areas of predefined quality of the data transmission 150. Then, the geo analyzer 421 is configured to determine the control data which indicates the quality of the data transmission 150 spatially-resolved, taking into account the determined area 221 of the predefined quality of the data transmission 150.

As can be seen from the above, it is the task of the geo analyzer 421 to execute interpolation between the discrete indicators received for the plurality of locations which locally indicate the quality of the data transmission 150 at the respective location and to provide the spatially-resolved quality of the data transmission 150 based on the determined area 221. As such, the spatially-resolved quality of the data transmission 150 may be two-dimensionally defined, e.g., defined contiguously within a target zone of certain extents. In some scenarios, the spatially-resolved quality of the data transmission 150 may also be three-dimensionally defined, e.g., for airplane-related services. The geo analyzer 421 and the measurement server 423 may be combined in one network element, which may also comprise the database 422.

According to various scenarios, it is possible that the control data as determined by the geo analyzer 421 is directly passed to the terminal 130 and/or the access node 112 and/or other network elements 116-119, 141. Then, the terminal 130 and/or the access node 112 and/or other network elements 116-119, 141 may select between different modes of operation of the data transmission 150.

According to further scenarios, it is possible that the control data as determined by the geo analyzer 422 is passed to a fencing agent 410. The fencing agent 410 is configured to determine the geo-fence 222 which encloses the area 221 of the impaired quality of the data transmission 150 as indicated by the control data; Alternatively or additionally, the fencing agent 410 is configured to determine the geo-fence which encloses the area of superior quality of the data transmission 150. As such, the fencing agent 410 implements fencing functionality. E.g., the fencing agent 410 can determine the geo-fence 222 such that it also encloses the safety margin 223. The safety margin 223 can act as a warning distance. It is then possible that the fencing agent 410 creates or modifies the control data such that it indicates the geo-fence 222. This control data can then be passed to the terminal 130 and/or the access node 112 and/or other network elements 116-119, 141. Then, the terminal 130 and/or the access node 112 and/or other network elements 116-119, 141 may select between different modes of operation of the data transmission 150.

Albeit in FIG. 4, the entities 410, 421, 422, 423 have been illustrated as separate entities, it should be understood that according to various scenarios it is possible that the entities 410, 421, 422, 423 are functional blocks implemented by software. As such, it is possible that the entities 410, 421, 422, 423 are co-located and implemented by the same physical entity.

E.g., the entities 410, 421, 422, 423 may be part of a proprietary operator-controlled network (not shown in FIG. 4). Albeit in FIG. 4, the entities 410, 421, 422, 423 have been illustrated as not being part of the HPLMN 113, in general it is possible that the entities 410, 421, 422, 423 are part of the HPLMN 113.

Figure 5:
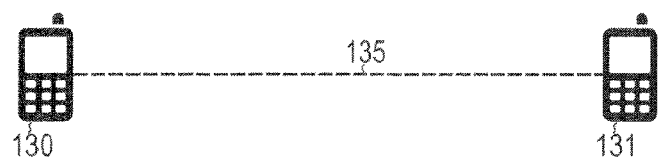
FIG. 5 illustrates an architecture used for said determining of the control data according to various embodiments, wherein the control data is determined by a further terminal.

In FIG. 5, various aspects of transmission of the control data via the D2D communication 135 are illustrated. In the scenario of FIG. 5, the further terminal 131 is configured to measure the indicator of the quality of the data transmission 150. In response to said measuring, the further terminal 131 is configured to send, via the D2D communication 135 to the terminal 130, the control data indicating the spatially-resolved quality of the data transmission 150. In some scenarios, it is possible that the further terminal 131 implements fencing functionality, i.e., determines the control data such that it indicates the spatially-resolved quality of the data transmission 150 as the geo-fence 222. In another scenario, it is possible that the further terminal 131 determines the control data such that it indicates the indicator 501 (cf. FIG. 6A) of the quality of the data transmission 150 at the current location of the further terminal 131. Then, it is possible that, e.g., by drawing a circle around the location of the indicator 501, the area 221 of the impaired quality of the data transmission 150 is determined. In such a scenario, it may be not necessary to implement the geo-fence 222. The area 221 is implicitly indicated by the indicator 501 and the associated current location of the further terminal 131.

Figure 6A:
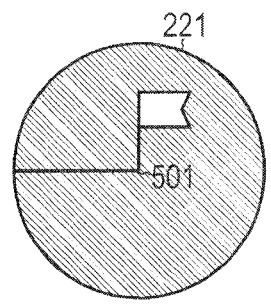
FIG. 6A schematically illustrates the area of impaired quality of the data transmission with respect to the further terminal according to various embodiments.
Figure 6B:
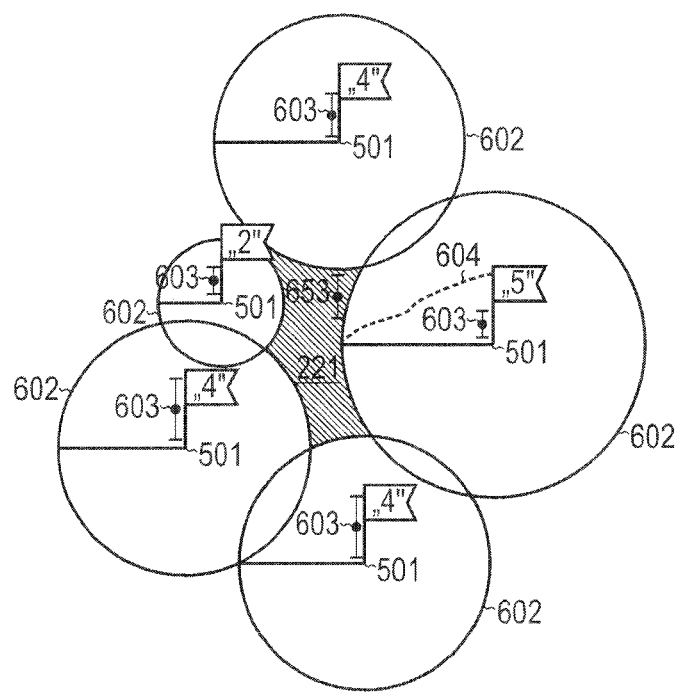
FIG. 6B schematically illustrates the area of impaired quality of the data transmission with respect to a plurality of locations for which indicators indicate the quality of the data transmission locally and discrete according to various embodiments.

With respect to FIG. 6B, aspects of determining the area 221 of impaired quality of the data transmission 150 by means of the geo analyzer 421 are illustrated. Illustrated in FIG. 6B are a plurality of indicators 501. The plurality of indicators 501 indicate the quality of the data transmission 150 locally and in a discreet manner (in the scenario of FIG. 6B, the quality of the data transmission 150 at the various of locations varies between a level of "2" and a level of "5" in arbitrary units; e.g., the units may depend on the figures of merit as discussed above). As such, each one of the plurality of indicators 501 is associated with a specific geo-location.

In some scenarios, the indicators 501 are retrieved from the database 422. In some scenarios, the indicators 501 are received as measurement reports from the further terminal 131. E.g., it can be preferable to receive—where available—the indicators 501 from the database 422. If the checking if the respective indicator 501 at a given one of the plurality of locations is available in the database 422 yields that the respective indicator 501 is not available in the database 422, it is possible to send a request message to the further terminal 131, said request message requesting the measurement report. E.g., for this, the measurement server 423 can be employed. E.g., the respective indicator 501 not being available in the database 422 can correspond to: within the predefined distance to a respective location, no indicator 501 being available in the database 422.

In the scenario FIG. 6B, each indicator 501 is associated with geo-coordinates specifying the geo-location and a certain spatial validity. The spatial validity may depend on various aspects. One aspect is the accuracy of the measurement related to geo-coordinates, e.g., the accuracy of the measurement. In case of Global Positioning System (GPS), the accuracy may depend on, amongst others, the GPS signal quality and the number of available satellites. Also, the associated quality of the data transmission 150 can have limited validity; this may stem from measurement uncertainties, etc. From all such properties, it is possible to determine a confidence level 603 (indicated in FIG. 6B by the error bars) for each one of the plurality of indicators 501 of the quality of the data transmission 150.

The geo analyzer 421 may be then configured to interpolate between the discrete indicators 501 to obtain a (e.g. 2-dimensionally) extended area 221 of the impaired quality of the data transmission 150. For this, it may be assumed that the spatial variation of the quality of the data transmission 150 does not exceeded a certain value. Then, it may be assumed that within a certain zone 602 in the surrounding of the location of the indicator 501, the quality of the data transmission 150 can be estimated comparably accurate based on the corresponding indicator 501. In a simple scenario, the zone 602 is estimated as a circle. In other scenarios, it is possible to take into account a radio signal propagation model 604 which may indicate, e.g., the spatial dependency of the radio signal strength of the corresponding radio link 111. The radio signal propagation models 604 can depend on the particular figure of merit used to quantify the quality of the data transmission 150 indicated by the indicator 501. E.g., where the quality of the data transmission 150 comprises the radio signal strength 156, the location associated with the indicator 501 can be seen as the location of an antenna with a given signal strength equaling the indicated radio signal strength 156; then, the radio signal strength is reduced for increasing distances to the location of the indicator 501, e.g., as a function inversely proportional to the distance. More complex radio signal propagation models 604 exist which may increase the accuracy in determining the zone 602; e.g., a topology comprising obstacles etc. may be taken into account.

By all such techniques, the available data on the quality of the data transmission 150 may be interpolated an extended to cover the (e.g. 2-dimensionally) extended zone 602 (indicated in FIG. 6B by the circles); here, it can be assumed that within the zone 602 the quality of the data transmission 150 does not fall below a predefined threshold between impaired quality of the data transmission 150 and non-impaired quality of the data transmission 150; such a predefined threshold may be service-specific and/or radio link-specific. While above techniques have been illustrated in detail which enable determining of the areas 221 of impaired quality of the data transmission 150, similar techniques may be readily applied when determining areas of superior quality of the data transmission 150.

To simplify the analysis and to keep processing impact low, it is possible that the predefined threshold is re-used when requests for similar services a triggered. E.g., it is possible that the predefined thresholds are classified into the different types of services. An example may comprise a predefined threshold of 1 kbit/second for simple connectivity and messaging services; 100 kbit/second for voice and advanced messaging services; 1 Mbit/second for standard definition streaming; 5 Mbit/second for high definition streaming; and 15 Mbit/second for multi-channel streaming or ultrahigh definition streaming. Then, results of determining the zones 602 may be re-used for different use cases.

An example is given: consider a data throughput per time 157 of 4.2 Mb/second being indicated as the quality of the data transmission 150 by a given one of the indicators 501 at the respective location. A predefined threshold between impaired quality of the data transmission 150 and non-impaired quality of the data transmission 150 may amount to 20 kb/second. By using statistical data of physics such as the radio signal propagation model 604, it can be determined—e.g., under the assumption of an open topology with no high buildings, etc.—that within the zone 602 of at least 500 m around the location of the indicator 501 the data throughput per time 157 does not fall below the predefined threshold between the impaired quality of the data transmission 150 in the non-impaired quality of the data transmission 150. The corresponding circle of the zone 602 can be marked as "service coverage".

Once all relevant indicators 501 have been processed, the geo analysis, in particular gap analysis can be done. Using all resulting zones 602, the area 221 of impaired quality of the data transmission 150 is determined. The area 221 can correspond to the area which is not covered by at least one of the zones 602. The area 221 may be marked as "no service coverage" or "reduced quality of service coverage". While above a scenario has been shown where the area 221 of impaired quality of the data transmission 150 is determined, generally, it is possible to determine the quality of data transmission 150 for a larger number of different levels of quality. E.g., in some scenarios an area of non-impaired quality of the data transmission 150 may be determined, i.e., an area marked as "service coverage". E.g., in some scenarios finer increments/a higher granularity of the quality of service than the binary logic "no service coverage" and "service coverage" can be implemented.

From the spatially-dependent quality of the data transmission 150, it is possible to determine the control data. E.g., the control data may indicate the area 221 of impaired quality of the data transmission 150 and/or the area of non-impaired quality of the data transmission and/or the area of superior quality of the data transmission employing isolines marking contours of areas of corresponding intervals of the quality of the data transmission 150. Here, the surface in a target zone may be mapped in terms of intervals of corresponding quality of the data transmission 150. A granularity with which the intervals are specified may vary.

It may be also possible to determine a confidence level 653 of the area 221 of the impaired quality of the data transmission, respectively of the spatially-resolved quality of the data transmission. E.g., the confidence level 653 may be determined by the number of overlapping zone 602 at a certain position. E.g., if there is a larger number (smaller number) of overlapping zone 602 at a certain location, it can be assumed at a higher confidence level (lower confidence level) 653 that the corresponding spatially-dependent quality of the data transmission 150 is reliable. The control data may also indicate the confidence level 653 of the spatially-dependent quality of the data transmission 150.

Figure 7:
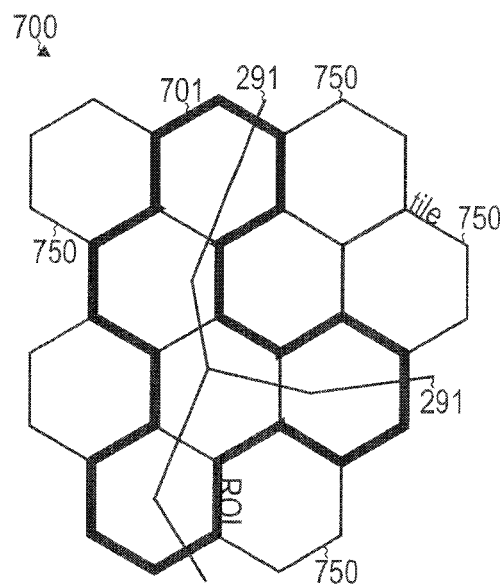
FIG. 7 schematically illustrates a target zone and a spatially-dependent filter which limits said determining of the control data to a region-of-interest, wherein according to various embodiments the region-of-interest is determined based on a geographical feature.

To keep processing impact low, it is possible to restrict or limit the determining of the control data to a region-of-interest 701, cf. FIG. 7. E.g., the geo analyzer 421 can be configured to determine the region-of-interest 701. When determining the region-of-interest 701, various influencing parameters can be taken into account. E.g., the region-of-interest 701 can be determined based on at least one of the confidence level 603 of the plurality of indicators 501 of the quality of the data transmission 150, one or more of the geographical features 291, 292, the spatial information 281, 282 of the terminal 130, a service 151, 152 for which the determining of the control data is requested, and the radio link 111.

The determining of the region-of-interest 701 is explained hereinafter greater detail. E.g., the determining of the control data can be requested for a certain target zone 700 by a requesting entity. E.g., the requesting entity can be a network element 130, 112, 116-119, 141 of the HPLMN 113 or the fencing agent 410. E.g., the target zone 700 can be centered with respect to the current location 281 and/or comprise the expected route 282. In the scenario of FIG. 7, the target zone 700 may be mapped to comprise several tiles 750 into which the entire service areas may be divided. In other scenarios, a continuous approach could be used. Employing the tiles 750 simplifies to reuse of an already carried-out previous analysis.

Next, within the target zone 700, non-relevant areas or areas which are untrusted regarding the indicators having a low confidence level 603 are determined. Non-relevant areas can for example be determined if the service 151, 152 for which the determining of the control data is requested relates to a vehicle which moves only on the roads 291 or follows pre-determined tracks. In such a scenario, it is possible that areas outside and remote of the roads 291 are non-relevant areas and can be excluded from the region-of-interest 701 (as illustrated in FIG. 7). In a further example, non-relevant areas can cover areas where high buildings or strongly changing topologies such as mountains are situated due to the low level of confidence 603.

Once the region-of-interest 701 has been determined, it is possible to execute techniques as illustrated above with respect to, e.g., FIG. 6B, for all tiles 750 that are situated within the region-of-interest 701.

Then, it is possible to provide the determined control data back to the requesting entity so that the areas 221 of impaired quality of the data transmission 150, respectively or superior quality of the data transmission 150, are indicated by the control data in a spatially-resolved manner—e.g., by means of isolines of intervals of corresponding quality of the data transmission 150—and mapped to the target zone 700 of the initial query. E.g., for large tiles 750, areas 221 outside of the target zone 700 may be left out from the control data. As mentioned above, it is possible that the control data further indicates the confidence level 603 of the spatially-resolved quality of the data transmission 150. This can occur according to a negotiated scheme, e.g., non-impaired quality of the data transmission 150 for more than five overlapping zones 601 for service class III, etc.

Optionally, the geo-fences 222 can be determined. Where the requesting entity is the fencing agent 421, the fencing agent 421 may then determine the geo-fences 222 enclosing the areas 221 of the impaired quality of the data transmission 150 or the areas of the superior quality of the data transmission 150. It is then possible that the control data may only indicate the geo-fences 222 enclosing the areas 221 of the impaired quality of the data transmission 150. By restricting the control data to indicate the areas 221 of the impaired quality of the data transmission 150, e.g., by means of the geo-fences 222, it is possible to limit the file size of the control data.

Summarizing, as will be appreciated from the above, techniques are provided which enable to determine areas where a predefined quality of a data transmission is present. In particular, above techniques are provided which enable to determine service and measurement gaps. Here, according to various scenarios, measurement data is collected and used to predict the quality of the data transmission in a surrounding of the location corresponding to the measurement data.

In various scenarios, the effect of a self-learning can be achieved, such that it is possible to close gaps where no indicators 501 are available and obtain an increasing accuracy, i.e., higher confidence level 653, over time automatically: In various scenarios, gaps where no indicators 501 are available can be determined and new measurements can be triggered. I.e., in other words, where only an insufficient density of measurement points corresponding to the indicators 501 is available, automated additional measurements can be triggered through measurement clients in the concerned areas such as the further terminal 131. The concerned areas can be filtered based on relevance. Such techniques can make use of the wider architecture that allows to trigger measurements and measurement clients connected to the measurement server 423. The measurements can be triggered for areas where no data at all exists, i.e., no indicators 501 are available; or for areas resulting from topological filter analysis, e.g., for areas with high buildings or mountains of for areas where the confidence level 653 is not sufficient.

Figure 8:
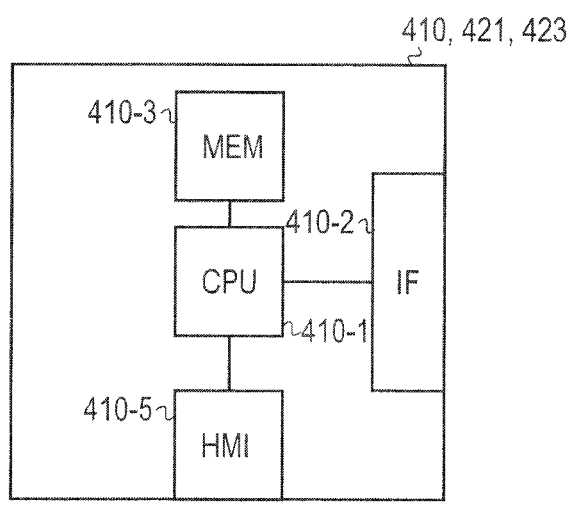
FIG. 8 schematically illustrates a device configured to determine the control data, wherein the device may implement at least one of a fencing agent, a geo analyzer, and a measurement server.

Turning to FIG. 8, the fencing agent 410, the geo analyzer 421, and the measurement server 423 are illustrated at greater detail. The devices 410, 421, 423 comprise a processor 410-1 which is configured to execute program code which is stored in the non-volatile memory 410-3. Furthermore, the devices 410, 421, 423 comprise an interface 410-2 via which communication with further entities is possible. Furthermore, the devices 410, 421, 423 comprise a human machine interface (HMI) 410-5. The HMI 410-5 is configured to output information to a user and receive information from a user.

Figure 9A:
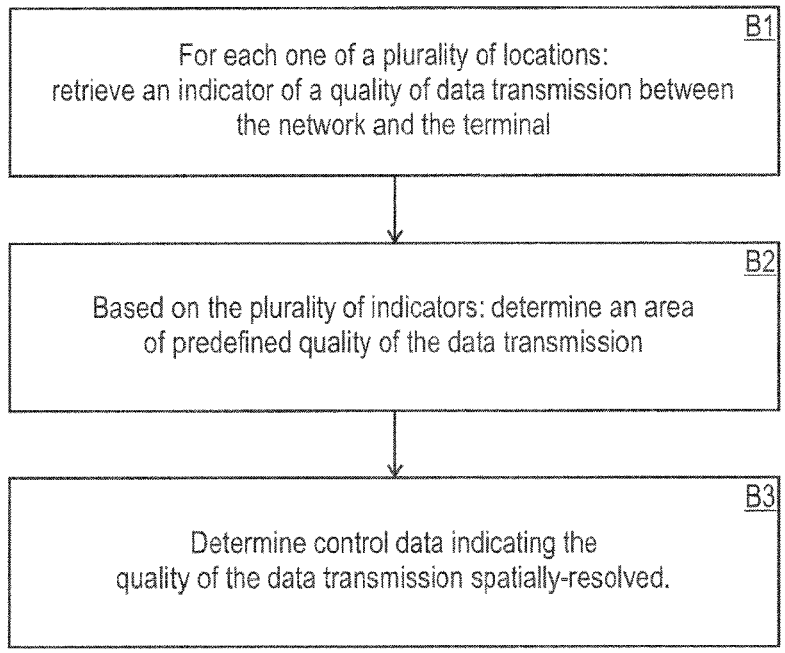
FIG. 9A is a flowchart of a method according to various embodiments, wherein said method comprises determining the control data indicating the quality of the data transmission spatially-resolved.

Execution of the program code causes the processor 410-1 to execute a method as illustrated by the flowchart of FIG. 9A. First, at B1, for each one of a plurality of locations a corresponding indicator 501 of the quality of the data transmission 150 between the HPLMN 113 and the terminal 130 is retrieved. This may comprise retrieving the indicator 501 from the database 422 and/or sending a request message to the further terminal 131, said request message requesting the measurement report. E.g., it is possible that the sending of the request message is selectively executed if no matching indicator 501 is available in the database 422. In the context of B1, techniques of the MDT may be employed.

At B2, the area of the predefined quality of the data transmission 150 is determined: I.e., it is possible that the area 221 of impaired quality of the data transmission 150 is determined; alternatively or additionally, the area of non-impaired quality of the data transmission 150 is determined; alternatively or additionally, the area of superior quality of the data transmission 150 is determined. As can be seen, the predefined quality of the data transmission 150 can relate to different values or value ranges depending on the scenario. As part of B2, it may be possible to interpolate the local and discrete indicators 501 by determining the zones 602; in this respect, it is possible to take into account at least one of the radio signal propagation models 604 and the confidence level 603 of the plurality of indicators 501 of the quality of the data transmission 150. Also, at B2, where the area 221 of the impaired quality of the data transmission 150 is determined, it may be possible to take into account the predefined threshold between impaired quality of the data transmission 150 and non-impaired quality of the data transmission 150.

At B3, the control data is determined. The control data indicates the quality of the data transmission spatially-resolved. E.g., the control data which is determined at B3 may indicate corresponding geo-fences 222 which enclose the area of predefined quality of the data transmission 150.

Figure 9B:
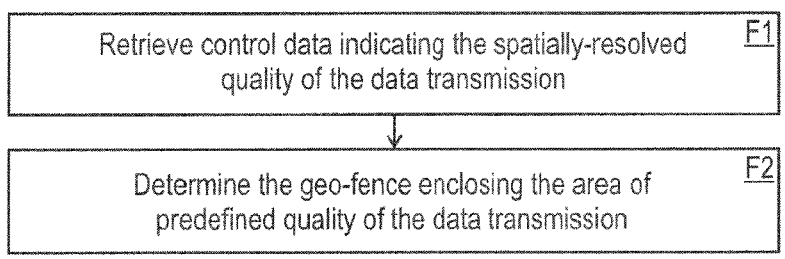
FIG. 9B is a flowchart of a method according to various embodiments, wherein a geo-fence enclosing an area of impaired quality of the data transmission is determined.

Execution of the program code causes the processor 410-1 to execute a method as illustrated by the flowchart of FIG. 9B. First, at F1, the control data is retrieved. E.g., the fencing agent 410 may receive the control data from the geo analyzer 421. The control data indicates the quality of data transmission 150 in a spatially-resolved manner. E.g., the control data may indicate areas of non-impaired quality of the data transmission 150 and/or areas 221 of impaired quality of the data transmission 150 and/or areas of superior quality of the data transmission 150. E.g., the control data may comprise isolines of intervals of corresponding quality of the data transmission 150.

At F2, one or more geo-fences 222 are determined which enclose the areas 221 of predefined quality of the data transmission 150. E.g., the geo-fences 222 may be determined such that they enclose a safety margin which, in turn, encloses the areas 221 of predefined quality of the data transmission 150. The predefined quality of the data transmission 150 may correspond to impaired quality of the data transmission 150, non-impaired quality of the data transmission 150, or superior quality of the data transmission 150.

It is possible that the control data may indicate the confidence level 653 for the different areas, in particular for the areas 221 of impaired quality of the data transmission 150. This may be taken into account when determining the geo-fences 222; e.g., geo-fences 222 may be selectively determined for such areas 221 having a confidence level 653 which is above a certain threshold.

Optionally, at F2, further geo-fences may be determined which enclose other areas, e.g., such areas that have a particular low confidence level 653, areas of non-impaired quality of the data transmission 150, etc. The determined geo-fences may be specific for a certain service and different geo-fences for different services may be determined, i.e., said determining of the geo-fences may be service-specific.

FIG. 10 is a flowchart of a method of determining the control data according to various embodiments. At C1, the indicator 501 of the quality of the data transmission is measured by the further terminal 131 implementing a measurement client. Here, MDT techniques may be employed.

Next, at C2, corresponding control data which indicates the spatially-resolved quality of the data transmission is sent to the terminal 130, e.g., employing the D2D communication 135 or being sent from the fencing-agent 410 to the terminal 130.

Figure 11:
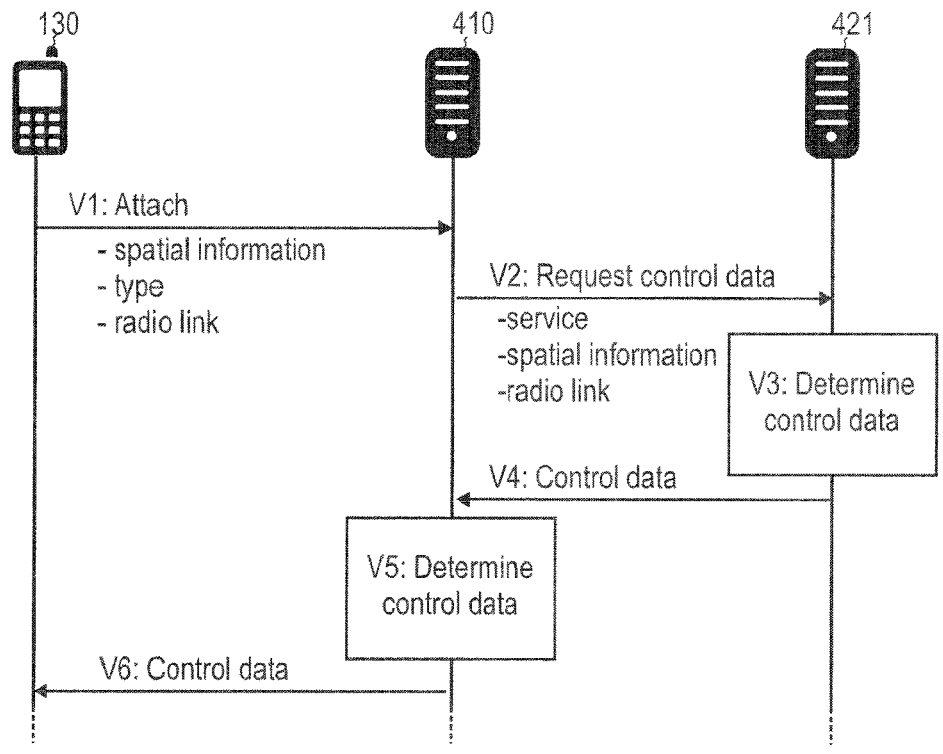
FIG. 11 is a signaling diagram of techniques of determining control data according to various embodiments, wherein control signaling is executed between the terminal, the fencing agent, and the geo analyzer.

FIG. 11 is an example signaling diagram illustrating aspects of determining the control data. The terminal 130 attaches to the HPLMN 113 and sends a control message V1 to the fencing agent 410. The control message V1 indicates the spatial information including the location 281 and optionally an expected route 282. Further, the control message V1 indicates the service(s) 151, 152 for which the data transmission 150 is desired and for which the determining of the control data is requested. Further, the control message V1 indicates the particular radio link(s) 111, 112 via which the data transmission 150 is established. The fencing agent 410 then sends a control message V2 to the geo analyzer 421; the control message V2 comprises the information previously provided to the fencing agent 410 from the terminal 130 as part of the control message V1.

The geo analyzer 421 receives the control message V2 and, in response to said receiving of the control message V2, determines to control data at V3. Then, the geo analyzer 421 sends the control data V4 that indicates the quality of the data transmission 150 to the fencing agent 410. In particular, the control data V4 may indicate the areas 221 of predefined quality of the data transmission 150. Here, it is possible that the control data V4 is determined such that it is service-specific and/or radio-link specific; for this, the information included in the control message V2 may be used, i.e., the indication of the service(s) 151, 152 for which the data transmission 150 is desired and for which the determining of the control data is requested and/or the particular radio link(s) 111, 112 via which the data transmission 150 is established. The target zone 700 can be determined based on the location 281 and/or the expected route 282.

Optionally, the fencing agent 410, at V5, determines the geo-fences 222 that enclose the areas 221 of the predefined quality of the data transmission 150. Then, optionally, the control data V6 that indicates the geo-fences 222 may be sent via the radio link 111 to the terminal 130; it would also be possible that the control data V6 is alternatively or additionally provided to the access node 112 or another network element 116-119, 141 of the HPLMN 113.

It is then possible that the terminal 130 or the another network element 116-119, 141 of the HPLMN 113, based on the control data, in particular based on the quality of the data transmission 150 which is indicated spatially-resolved by the control data V6, selects between operation of the data transmission 150 in a first mode and in a second mode (not shown in FIG. 11). Where the control data also indicates the confidence level 653 of the spatially-resolved quality of the data transmission 150, said the selecting may further be based on the confidence level 653.

Figure 12:
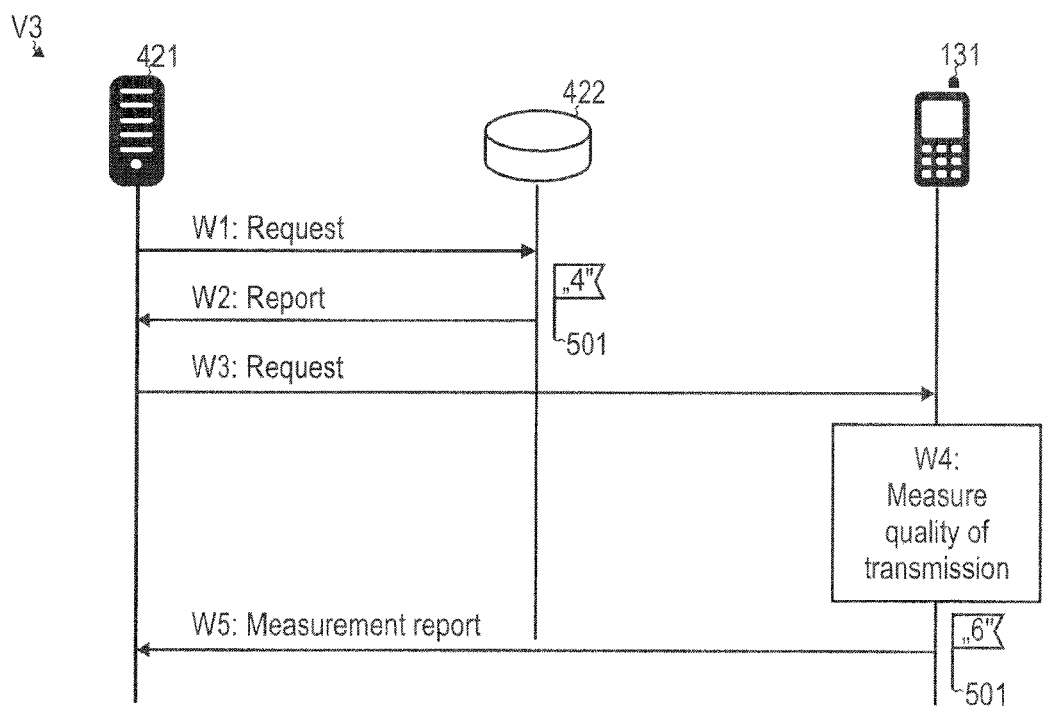
FIG. 12 is a signaling diagram of techniques of determining the control data according to various embodiments, wherein control signaling is executed between the geo analyzer, a database, and a further terminal implementing a measurement client.

In FIG. 12, example aspects of the determining of the control data according to step V3 of FIG. 11 are illustrated at greater detail. First, a request message W1 is sent to the database 422. By means of the request message W1, it is checked if a respective indicator 501 of the quality of the data transmission 150 at a given one of a plurality of locations within the target zone 700 is available. E.g., request messages W1 may be sent for every tile 750 within the target zone 700. It may be also possible at this point to consider the region-of-interest 701 by applying the spatially-dependent filter which limits determining of the control data V4 to the region-of-interest 701; the request messages W1 may only be sent for those tiles 750 within the region-of-interest 701.

The database 422 sends a report message W2 to the geo analyzer 421. In the scenario of FIG. 12, the report message W2 comprises one or more the indicators 501 indicating the quality of the data transmission 150 at given locations, e.g., within the requested tile(s) 750.

In other scenarios, it is possible that the database 422 has no respective indicator 501 of the quality of the data transmission 150 available at one or more of the respective locations, e.g., no indicator 501 in the one or more respective tile 750; this could be indicated by means of the report message W2 as well.

At W3, a request message is sent to the further terminal 131, the request message W3 requesting a measurement report W5. In response to receiving the request message W3, the further terminal 131 is configured to measure the quality of the data transmission 150, at W4. The measurement report W5 comprises the indicator 501 of the measured quality of the data transmission 150 at the respective location. E.g., the request message W3 could be send on-demand where no corresponding indicator 501 is available in the database 422.

It should be noted that while with respect to FIG. 12 the measurement server 423 is not involved in gathering of the indicators 501, in further scenarios it is possible that the measurement server 423 mediates, e.g., the communication in between the geo analyzer 421 and the further terminal 131.

Section 2

Selecting Between Operation of the Data Transmission in the First Mode and in the Second Mode With respect to FIGS. 13A, 13B, 14, 15A, 15B, 15C, 16, 17 various aspects with respect to FIG. 3: A1, i.e., selecting between operation of the data transmission in the first mode and in the second mode are illustrated.

Figure 13A:
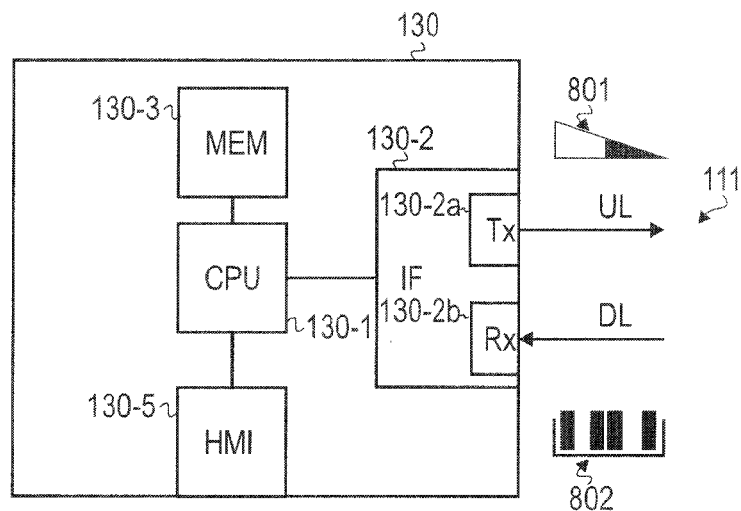
FIG. 13A schematically illustrates the terminal.

In FIG. 13A, the terminal 130 are schematically illustrated. The terminal 130 comprises a processor 130-1 which is coupled with a memory 130-3, e.g., a non-volatile memory. Further, the terminal 130 comprises a radio interface 130-2 which comprises a receiver 130-2b in a transmitter 130-2a. The terminal 130 further comprise an HMI 130-5. The HMI 130-5 is configured to output information to a user and receive information from a user. The further terminal 131 may be configured accordingly.

Figure 13B:
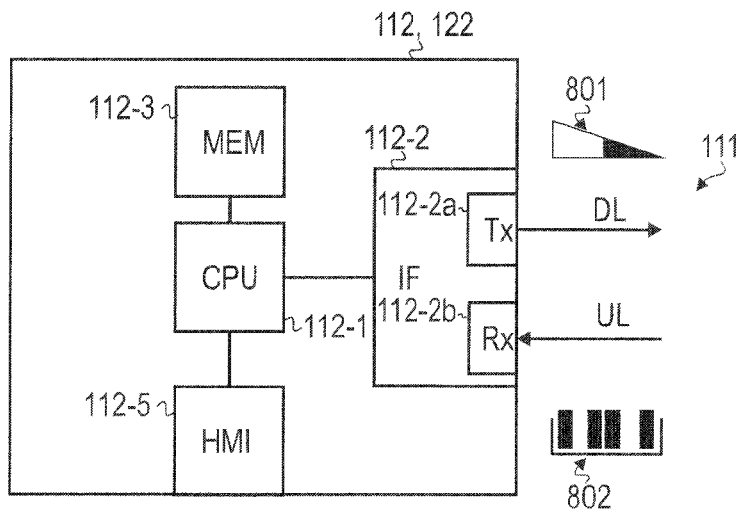
FIG. 13B schematically illustrates the access node of the network.

In FIG. 13B, the access nodes 112, 122 are schematically illustrated. The access nodes 112, 122 comprise a processor 112-1 which is coupled with a memory 112-3, e.g., a non-volatile memory. Further, the access nodes 112, 122 comprise a radio interface 112-2 which may comprises a receiver 112-2b and a transmitter 112-2a. The access nodes 112, 122 may further comprise an HMI 112-5. The HMI 112-5 is configured to output information to a user and receive information from a user.

Referring to FIGS. 13A and 13B, by controlling the radio interfaces 112-2, 130-2, it is possible to select between operation of the data transmission 115 in different modes. Here, generally, the radio interfaces 112-2, 130-2 of, both, the terminal 130 and the corresponding access node 112 can be controlled; in other scenarios, it is possible that only one of the two radio interfaces 112-2, 130-2 of either the terminal 130 or the corresponding access node 112 are controlled.

Hereinafter, various parameters that can be controlled when selecting between operation of the data transmission 150 in various modes are illustrated. In particular, hereinafter, various parameters are illustrated that can be controlled when selecting between operation of the data transmission 150 in the normal mode and in the resilience mode of operation. The resilience mode of operation may be selected if the spatial information 281, 282 and a spatially-resolved quality of the data transmission 150 correspond to impaired quality of the data transmission 150. E.g., this may be the case, where at least one of the location 281 of the terminal and the expected route 282 of the terminal 130 is located inside the geo-fence 222.

USER WARNING: It is possible to issue a warning to a user when operating in the resilience mode of operation. The warning may be issued via the HMI 130-5. The warning may prompt the user to change settings of the terminal 130 manually.

TRANSMISSION POWER: A transmission power 801 for sending data via the uplink or downlink data transmission 150 can be set depending on the mode of operation of the data transmission 150. E.g., where it is expected that the terminal 130 will encounter impaired quality of the data transmission 150, the larger transmission power 801 can be selected as the resilience mode of operation. The transmission power 801 can be set at the terminal 130 and/or the access node 112, 122.

BUFFER SIZE: Further, a buffer size of a buffer 802 for the data transmission 150 can be set; e.g., the buffer size of a receive buffer 802 and/or a transmit buffer 802 can be set depending on the mode of operation of the data transmission 150. E.g., where it is expected that the terminal 130 will encounter impaired quality of the data transmission 150, a larger size of the data buffer 802 can be selected as the resilience mode of operation. This allows to preemptively buffer more data such that the impaired quality of transmission 150 may be temporarily compensated for. The buffer size may be set at the terminal 130 and/or the access node 112, 122. In further scenarios, the buffer may be a higher-layer buffer. Here, it may be possible to switch select between cloud-storage of data transmitted via the data transmission 150 in the network 113, 123, 140, and local-storage of the data in the terminal 130, depending on the mode of operation of the data transmission 150. E.g., in the resilience mode of operation, local-storage can be activated for data transmitted via the data transmission 150.

ERROR CORRECTION: Further properties that can be set depending on the mode of operation of the data transmission 150 comprising, but are not limited to: properties of an Automatic Repeat Request (ARQ) protocol, properties of an Acknowledgment (ACK) scheme, properties of a Forward Error Correction (FEC), etc. All such properties typically influence the data transmission 150. E.g., it is possible to better protect the data transmission 150 against impaired quality if certain properties of the ARQ protocol and the FEC are adjusted accordingly as the resilience mode of operation at the terminal 130 and/or the access node 112, 122.

MEDIUM ACCESS CONTROL: Further properties that can be set depending on the mode of operation of the data transmission 150 comprise controlling a Medium Access Control (MAC) of the data transmission 150 to prioritize for example a first service 151 over a second service 152 as the resilience mode of operation where it is expected that the terminal 130 will encounter impaired quality of the data transmission 150. Thereby, the first service 151 which may be more sensitive to the impaired quality of the data transmission 150 has the chance to pre-buffer a larger amount of data before encountering the impaired quality of the data transmission 150. In this regard, it may be also possible that the spatially-resolved quality of the data transmission 150 is provided service-specific for at least one service 151, 152. In such a scenario, it may be possible that it is expected that the first service 151 is affected by the impaired quality of the data transmission 150, while the second service 152 does not suffer from the impaired quality of the data transmission 150; it also in such a case, it may be favorable to control the MAC of the data transmission 150 to prioritize the first service 151 over the second service 152 as the resilience mode of operation. The MAC may be controlled at the terminal 130 and/or the access node 112, 122.

RADIO LINK: It is also possible to control the radio interface 130-2 of the terminal 130 to select between multiple radio links 111, 121 for the data transmission 150 depending on the mode of operation of the data transmission 150. E.g., it is possible that the control data indicates the spatially-resolved quality of the data transmission 150 radio-link specific for the plurality of radio links 111, 122. E.g., where it is expected that a first one of the radio links 111, 121 will suffer from the impaired quality of the data transmission 150 by having, e.g., a coverage gap, but a second one of the multiple radio links 111, 121 exhibits non-impaired quality of the data transmission 150, it may be favorable to control routing of the data transmission 150 via the second radio link 121 as the resilience mode of operation. The routing may be set at the terminal 130 and/or the access node 112, 122.

SERVICE BEHAVIOR: The operation of the data transmission 150 may be also affected by parameters related to a behavior of at least one service 151, 152 which provides data for the data transmission 150. Thus, the controlling the operation of the data transmission 150 may not include setting transmission control parameters which are directly influencing the data transmission 150 in some scenarios; rather other aspects of behavior of the at least one service 151, 152 may be controlled and set in order to select between operation of the data transmission 150 in various modes. E.g., the normal mode of operation of the data transmission 150 and the resilience mode of operation of the data transmission 150 may have a service-specific behavior of data of the at least one service 151, 152 being transmitted on the data transmission 150. E.g., in the resilience mode of operation it is possible to control one service 151 such that zero data is transmitted on the data transmission 150 and to control another service 152 to transmit data one the data transmission 150; e.g., in the normal mode of operation it is possible to control the service 151 to transmit data on the data transmission 150 and to control the another service 152 to transmit zero data on the data transmission 150. Transmitting no or zero data can be generally implemented by switching off the respective service 151, 152 or temporarily halting the respective service 151, 152. By such techniques, the mode of operation of the data transmission 150 can be changed without modifying the directly transmission-related parameters as such.

OTHER NETWORK ELEMENTS: While above various scenarios have been illustrated where the radio interfaces 112-2, 130-2 are controlled by setting the terminal 130 and/or the access node 112, 122, generally, properties of operation of different network elements can be controlled to select between operation of the data transmission 150 in different modes. E.g., the PCRF 119 could be controlled to temporarily prioritize the data transmission 150 over other data transmissions as the resilience mode of operation; thereby it may be possible to temporarily implement higher data throughputs per time 157 which allows to buffer more data at the terminal 130 before the terminal 130 reaches the area 221 of impaired quality of the data transmission 150. Here, it may be possible that such a prioritization occurs subscriber-specific. For this, user profile data may be received from a subscriber profile repository.

As can be seen from the above, said selecting between operation of the data transmission 150 in the first mode and in the second mode may comprise controlling a wide range of entities and furthermore a wide range of operation parameters of these entities. Different examples in this regard as given above can be combined with each other.

As explained above, in some scenarios, the spatially-resolved quality of the data transmission 150 may indicate a spatially-resolved quality of the data transmission 150 on the radio link 111; in such a scenario it is possible that properties of the radio interfaces 130-2, 112-2 that access the radio link 111 are controlled. In other scenarios, it is possible that the spatially-resolved quality of the data transmission 150 relates to the EPC 113A of the HPLMN 113; in such a scenario, it is possible that properties of the network elements of the EPC 113A are controlled.

Sometimes, the control data may indicate the confidence level 653 of the spatially-resolved quality of the data transmission 150. Then it may be possible to select between the operation of the data transmission 150 in the normal mode and the resilience mode depending on the confidence level 653. E.g., where the confidence level 653 associated with an area of impaired quality of the data transmission 150 is particularly low, it may be possible to override the resilience mode and continue operation in the normal mode.

Figure 14:
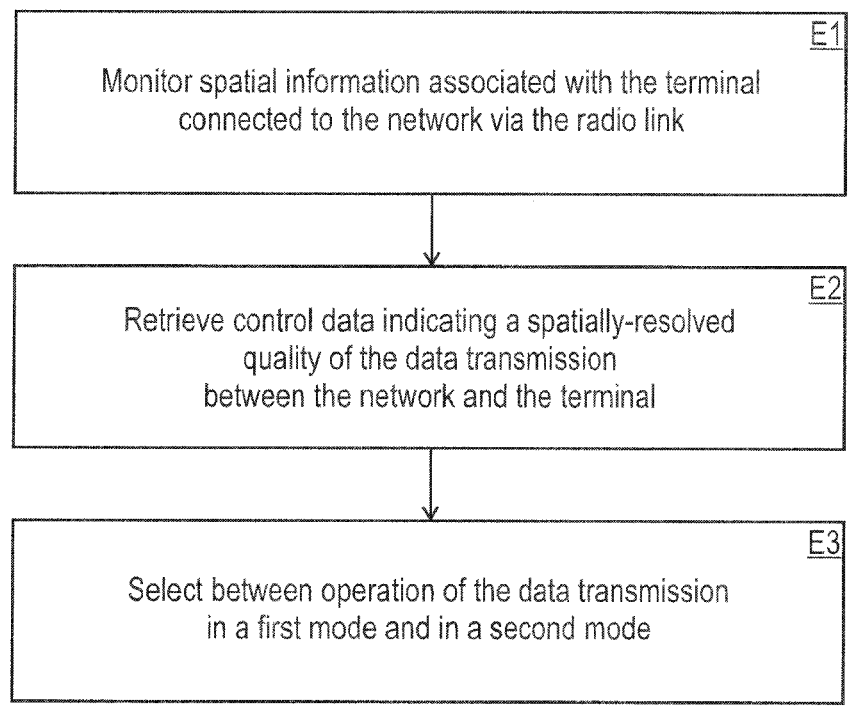
FIG. 14 is a flowchart of a method according to various embodiments, wherein the method comprises selecting between operation of the data transmission in the first mode and in the second mode depending on the spatially-resolved quality of the data transmission.

Referring to FIG. 13A, executing the program code stored in the memory 130-3 causes the processor 130-1 to execute a method according to FIG. 14. Likewise, in referring to FIG. 13B, executing the program code stored in the memory 112-3 causes the processor 112-1 to execute the method according to FIG. 14. Thus, the method of FIG. 14 may be executed by the UE 130 and/or the access node 112, 122.

In FIG. 14, at E1, the spatial information 281, 282 associated with the terminal 130 is monitored. Monitoring the spatial information may comprise checking the spatial information 281, 282 from time to time. This may comprise sending or receiving location pings etc. from time to time. Where no up-to-date spatial information 281, 282 is available, the last known position or a likely zone of the actual location may be used or interpolated.

At E2, the control data indicating the spatially-resolved quality of the data transmission 150 between the network 113, 123, 140 and the terminal 130 is retrieved. This may comprise the terminal 130 receiving the control data from the network 113, 123, 140. This may also comprise sending the control data to the terminal 130 via the radio link 111, 121.

At E3, it is selected between operation of the data transmission 150 in the first mode and in the second mode; e.g., at E3, it is possible to select between the normal mode and the resilience mode. Various parameters of various elements may be controlled, as explained above. E.g., a warning may be issued in the resilience mode. It is possible to have more than two modes.

Figure 15A:
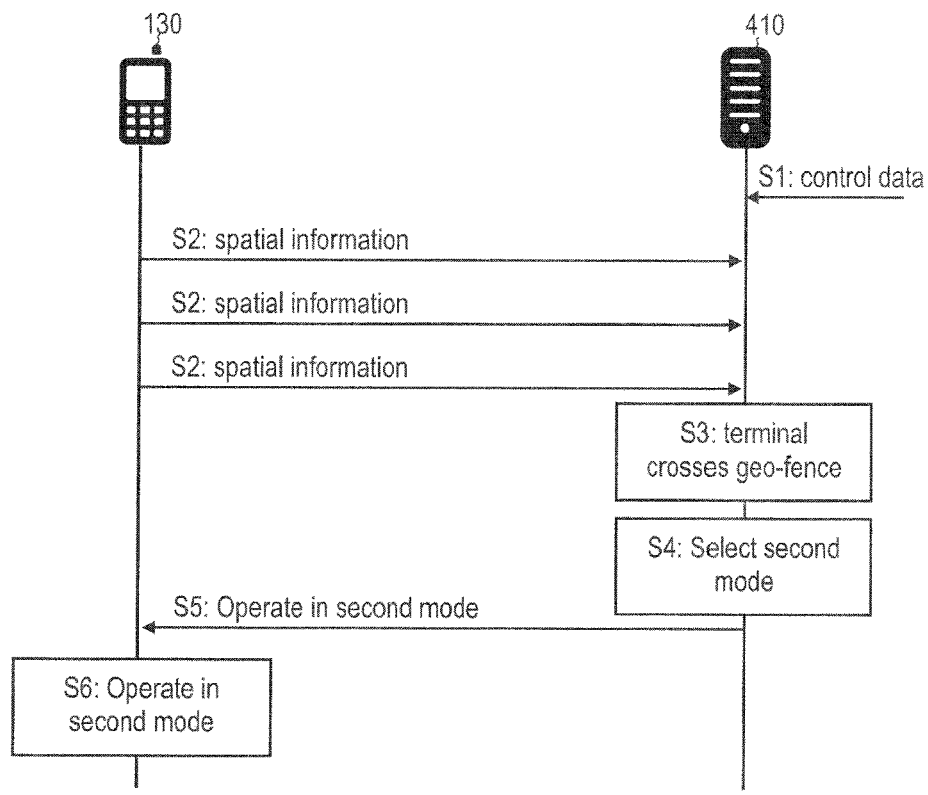
FIG. 15A is a signaling diagram illustrating aspects of said selecting between the operation of the data transmission in the first mode and in the second mode, wherein said selecting comprises setting an operation parameter of the data transmission at the terminal.

In FIG. 15A, an example signaling diagram illustrating various aspects of selecting between different modes of operation of the data transmission 150 are illustrated. first, the fencing agent 410 receives the control data S1. Optionally, the fencing agent 410 determines the geo-fences 222 that enclose the area of predefined quality of the data transmission 150.

Next, the terminal 130 sends the spatial information 281, 282 at S2 comprising its current location 281 and/or the expected route 282 via the radio link 111 to the fencing agent 410. The fencing agent 410 monitors the spatial information S2 which may be sent a plurality of times.

At S3, the fencing agent 410 detects that the terminal crosses the geo-fence 221. Then, the fencing agent 410 selects the second mode of operation of the data transmission 150, i.e., selects the resilience mode. The fencing agent 410 may control the terminal 130 accordingly: A corresponding control message S5 is sent by the fencing agent 410 and received by the terminal 130; in response to receiving the control message S5, the terminal 130 operates in the resilience mode.

In the scenario of FIG. 15A, it can be seen that operation of the data transmission 150 in the resilience mode may comprise controlling the terminal 130 accordingly. Referring to example FIG. 15B, which generally corresponds to FIG. 15A, it can be seen that alternatively or additionally, the control message S5 may also be sent to the access node 112; in response to receiving the control message S5, the access node 112 operates in the resilience mode.

Figure 15B:
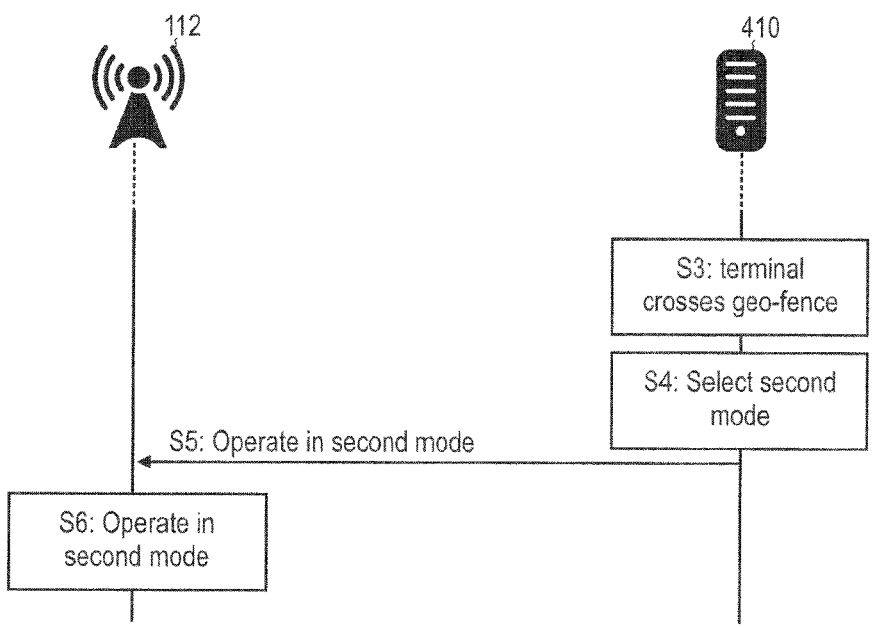
FIG. 15B is a signaling diagram illustrating aspects of said selecting between the operation of the data transmission in the first mode and in the second mode, wherein said selecting comprises setting an operation parameter of the data transmission at the access node.
Figure 15C:
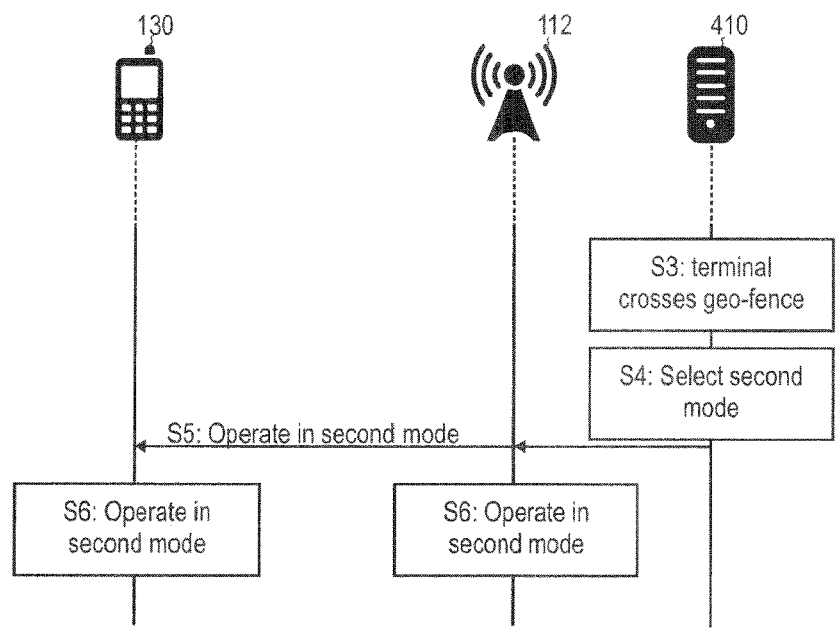
FIG. 15C is a signaling diagram illustrating aspects of said selecting between the operation of the data transmission in the first mode and in the second mode, wherein said selecting comprises setting an operation parameter of the data transmission at the access node and further comprises setting an operation parameter of the data transmission at the terminal.
Figure 16:
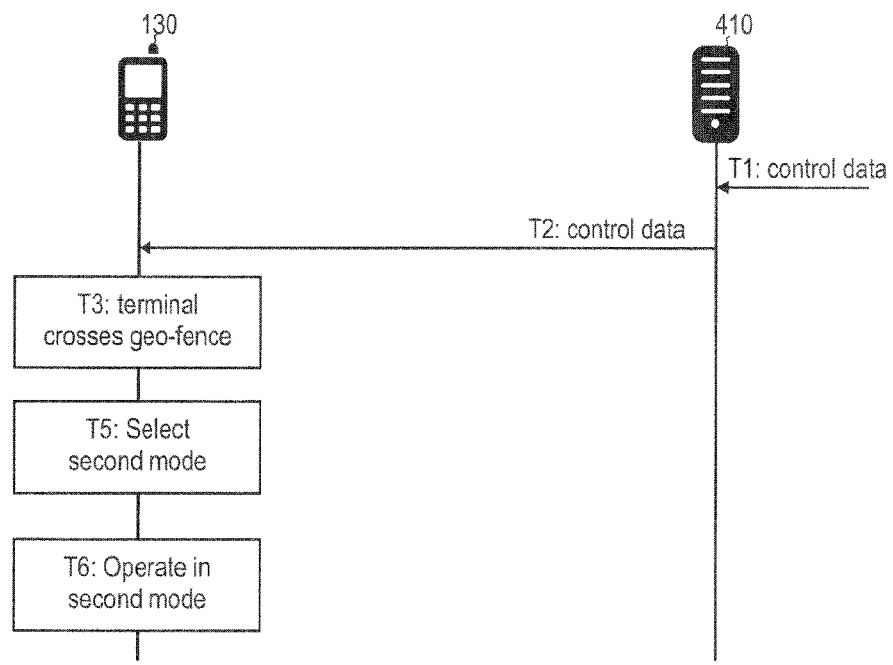
FIG. 16 is a signaling diagram illustrating aspects of said selecting between the operation of the data transmission in the first mode and in the second mode, wherein said selecting comprises setting an operation parameter at the terminal, wherein FIG. 16 further illustrates aspects of monitoring spatial information associated with the terminal by the terminal.

Turning to example FIG. 15C, which generally corresponds to FIGS. 15A and 15B, a scenario is shown where the control message S5 is sent to, both, the access node 112 as well as the terminal 130; in response to receiving the control message S5, both, the access node 112 as well as the terminal 130 operate in the resilience mode.

Furthermore, it would be possible that the control message S5 is sent to one or more further network elements 116, 117, 118, 119, 141 of the EPC 113A (not shown in FIGS. 15A-15C). In response to receiving the control message S5, the respective network elements 116, 117, 118, 119, 141 operate in the resilience mode.

Furthermore, while corresponding functionality of monitoring the spatial information 281, 282 of the terminal 130 (S3) and selecting between operation of the data transmission 150 in the normal mode and in the resilience mode (S4) may be executed by the fencing agent 410 in the scenarios of FIGS. 15A-15C, generally, it is possible that corresponding functionality may be at least partly executed by different network elements 116, 117, 118, 119, 141, e.g., by the radio access node 112 and/or the terminal 130 and/or the PCRF 119.

With respect to FIGS. 15A-15C, example scenarios have been illustrated where the functionality of the monitoring of the spatial information 281, 282 associated with the terminal 130 resides in the network-side. Also, the functionality of selecting between modes of operation of the data transmission 150 resides in the network-side. With respect to the example signaling diagram of FIG. 16, aspects of monitoring the spatial information 281, 282 at the terminal 130 and selecting between modes of operation of the data transmission 150 at the terminal 130 are illustrated.

First, the fencing agent 410 receives the control data T1; the control data T1 indicates the spatially-resolved quality of the data transmission 150. Optionally, the fencing agent 410 determines the geo-fences 222 that enclose the areas of predefined quality of the data transmission 150. The fencing agent 410 then sends the control data T2 via the radio link 111 to the terminal 130.

The terminal then monitors the spatial information 281, 282 and, at T3, detects that it crosses or is about to cross the boundary of the geo-fence 222, respectively comes close to or is about to come close to an area of predefined quality of the data transmission. Here, the safety margin 223 may be employed.

Then, the terminal 130 selects the resilience mode of operation of the data transmission 150, T5. Then, the terminal 130 operates in the resilience mode of the operation of the data transmission 150, T6.

Optionally, it is possible that the terminal 130 sends a control message to the access node 112 and/or further network elements 116-119 of the EPC 113A in order to control the access node 112 and/or the further network elements 116-119, 141 to select the operation of the resilience mode of the data transmission 150.

Figure 17:
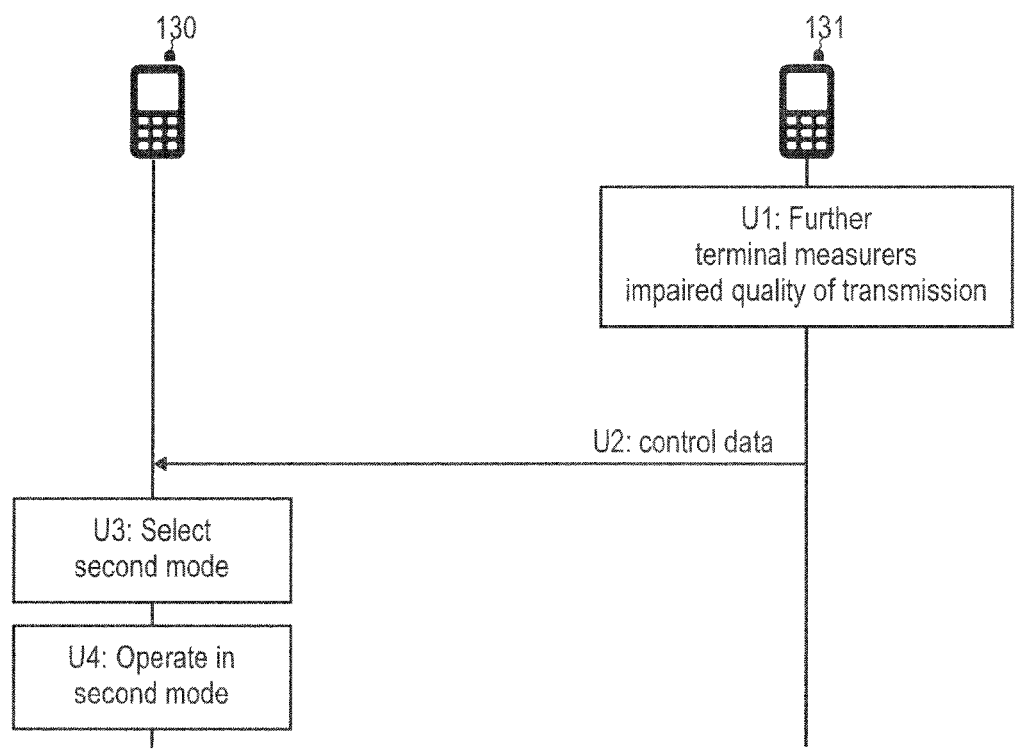
FIG. 17 is a signaling diagram illustrating aspects of said selecting between the operation of the data transmission in the first mode and in the second mode, wherein said selecting depends on the spatially-resolved quality of data transmission indicated by the control data, wherein the control data is received via device-to-device communication from the further terminal.

In the example signaling diagram of FIG. 17, aspects of sending the control data indicating the spatially-resolved quality of the data transmission 150 via the D2D communication 135 are illustrated. At U1, the further terminal 131 measures impaired quality of the data transmission 150. Then, the further terminal 131 sends the control data U2 indicating the spatially-resolved quality of the data transmission 150 to the terminal 130 via the D2D communication. Steps U3 and U4 correspond to steps T5 and T6.

Summarizing, above techniques have been illustrated which enable to automatically generate control data that indicates a spatially-resolved quality of data transmission between a network and a terminal. In particular, concepts as described herein enable to automatically generate geofences. Techniques of geo-fencing allow to trigger actions based on predefined geographical areas. If a geographical area defined by the geo-fences is entered or left by a terminal, corresponding action can be triggered. These action include selecting between operation of the data transmission in the first mode and in a second mode. Depending on the mode of operation of the data transmission, precautionary measures can be taken to ensure service continuity and to increase the service experience for the user. Coverage databases and/or measurement reports collected from measurement clients can be used in order to determine the control data.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while above reference has been made to impaired quality of the data transmission, in various scenarios corresponding concepts and techniques can be readily applied to non-impaired quality of the data transmission or superior quality of the data transmission.

The invention claimed is:

1. A method, comprising:
   monitoring spatial information associated with a terminal connected to a network via a radio link,
   retrieving control data indicating a spatially-resolved quality of a data transmission between the network and the terminal, wherein the spatially-resolved quality of the data transmission comprises a geo-fence enclosing an area of predefined quality of data transmission, and
   depending on the spatial information and further depending on the spatially-resolved quality of the data transmission, selecting between operation of the data transmission in a first mode and in a second mode, wherein operation in the first mode is selected if at least one of a location of the terminal and an expected route of the terminal is not located inside the geo-fence, and wherein operation in the second mode is selected if at least one of the location of the terminal and the expected route of the terminal is located inside the geo-fence.

2. The method of claim 1, wherein the control data indicates at least one of:
   the spatially-resolved quality of the data transmission service-specific for at least one service; and
   the spatially-resolved quality of the data transmission radio-link specific for a plurality of radio links.

3. The method of claim 1, wherein the spatial information comprises one or more of:
   a location of the terminal; and
   an expected route of the terminal.

4. The method of claim 1, wherein the spatially-resolved quality of the data transmission comprises one or more of:
   a latency;
   a radio signal strength of transmission on the radio link;
   a data throughput per time; and
   a quality of service of a given service.

5. The method of claim 1,
   wherein the operation in the first mode is selected if the spatial information and the spatially-resolved quality of the data transmission correspond to non-impaired quality of the data transmission,
   wherein the operation in the second mode is selected if the spatial information and the spatially-resolved quality of the data transmission correspond to impaired quality of the data transmission.

6. The method of claim 1,
   wherein the control data further indicates a confidence level of the spatially-resolved quality of the data transmission,
   wherein said selecting between the operation of the data transmission in the first mode and in the second mode further depends on the confidence level.

7. The method of claim 1,
   wherein the operation in the first mode comprises controlling a radio interface to implement a first transmission power for transmission on the radio link,
   wherein the operation in the second mode comprises controlling the radio interface to implement a second transmission power for transmission on the radio link,
   wherein the second transmission power is larger than the first transmission power.

8. The method of claim 1,
   wherein the operation in the first mode comprises controlling a data buffer to implement a first buffer size for the data transmission,
   wherein the operation in the second mode comprises controlling the data buffer to implement a second buffer size for the data transmission,
   wherein the second buffer size is larger than the first buffer size.

9. The method of claim 1,
   wherein the operation in the second mode comprises controlling a medium access control of the data transmission to prioritize, if compared to the operation in the first mode, a first service over a second service.

10. The method of claim 1, wherein operation in the first mode is selected if the terminal is not located inside the geo-fence, and wherein operation in the second mode is selected if the terminal is located inside the geo-fence.

11. The method of claim 1, wherein operation in the first mode is selected if the expected route of the terminal is not located inside the geo-fence, and wherein operation in the second mode is selected if the expected route of the terminal is located inside the geo-fence.

12. A device, comprising;
   at least one processor configured to monitor spatial information associated with a terminal connected to a network via a radio link,
   wherein the at least one processor is further configured to retrieve control data, the control data indicating a spatially-resolved quality of a data transmission between the network and the terminal, wherein the spatially-resolved quality of the data transmission comprises a geo-fence enclosing an area of predefined quality of the data transmission, and wherein the at least one processor is further configured to select between operation of the data transmission in a first mode and in a second mode, depending on the spatial information and further depending on the spatially-resolved quality of the data transmission, wherein operation in the first mode is selected if at least one of a location of the terminal and an expected route of the terminal is not located inside the geo-fence, and operation in the second mode is selected if at least one of the location of the terminal and the expected route of the terminal is located inside the geo-fence.

13. The device of claim 12, wherein the spatial information comprises one or more of:
a location of the terminal; and
an expected route of the terminal.

14. The device of claim 12, wherein the spatially-resolved quality of the data transmission comprises one or more of:
a latency;
a radio signal strength of transmission on the radio link;
a data throughput per time; and
a quality of service of a given service.

15. The device of claim 12,
wherein the control data further indicates a confidence level of the spatially-resolved quality of the data transmission,
wherein the at least one processor is configured to select between the operation of the data transmission in the first mode and in the second mode further depending on the confidence level.

16. The device of claim 12,
wherein the operation in the first mode is selected if the spatial information and the spatially-resolved quality of the data transmission correspond to non-impaired quality of the data transmission,
wherein the operation in the second mode is selected if the spatial information and the spatially-resolved quality of the data transmission correspond to impaired quality of the data transmission.

17. The device of claim 12,
wherein the control data further indicates a confidence level of the spatially-resolved quality of the data transmission,
wherein the at least one processor is configured to select between the operation of the data transmission in the first mode and in the second mode further depending on the confidence level.

18. The device of claim 12, wherein the control data indicates at least one of:
the spatially-resolved quality of the data transmission service-specific for at least one service; and
the spatially-resolved quality of the data transmission radio-link specific for a plurality of radio links.

19. The device of claim 12,
wherein the at least one processor is configured to control a radio interface to implement a first transmission power for transmission on the radio link when selecting the operation of the data transmission in the first mode,
wherein the at least one processor is configured to control the radio interface to implement a second transmission power for transmission on the radio link when selecting the operation of the data transmission in the second mode,
wherein the second transmission power is larger than the first transmission power.

20. The device of claim 12,
wherein the at least one processor is configured to control a data buffer to implement a first buffer size for the data transmission when selecting the operation of the data transmission in the first mode,
wherein the at least one processor is configured to control the data buffer to implement a second buffer size for the data transmission when selecting the operation of the data transmission in the second mode,
wherein the second buffer size is larger than the first buffer size.

21. The device of claim 12,
wherein the at least one processor is configured to control a medium access control of the data transmission to prioritize, if compared to the first mode, a first service over a second service when selecting the operation of the data transmission in the second mode.

22. The device of claim 12,
wherein the at least one processor is configured to control routing of the data transmission via the radio link when selecting the operation of the data transmission in the first mode,
wherein the at least one processor is configured to control routing of the data transmission via a further radio link when selecting the operation of the data transmission in the second mode.

23. The device of claim 12, wherein operation in the first mode is selected if the terminal is not located inside the geo-fence, and wherein operation in the second mode is selected if the terminal is located inside the geo-fence.

24. The device of claim 12, wherein operation in the first mode is selected if the expected route of the terminal is not located inside the geo-fence, and wherein operation in the second mode is selected if the expected route of the terminal is located inside the geo-fence.

* * * * *